(12) United States Patent
Konishi

(10) Patent No.: US 6,498,659 B1
(45) Date of Patent: Dec. 24, 2002

(54) CHARACTER IMAGE LAYOUT METHOD AND DEVICE

(75) Inventor: Yoshiharu Konishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/213,962

(22) Filed: Dec. 17, 1998

(30) Foreign Application Priority Data

Dec. 19, 1997 (JP) .............................................. 9-365056

(51) Int. Cl.$^7$ .............................................. G06F 15/00
(52) U.S. Cl. ..................... 358/1.18; 358/1.14; 358/515; 358/517; 345/418; 400/615.2
(58) Field of Search ............................. 358/1.18, 1.14, 358/1.6, 1.1, 1.2, 515, 517, 518, 527; 345/418, 428, 431, 433; 400/615.2, 61, 3

(56) References Cited

FOREIGN PATENT DOCUMENTS

JP          5185663          7/1993

*Primary Examiner*—Mark Wallerson
*Assistant Examiner*—Twyler Lamb
(74) *Attorney, Agent, or Firm*—Hogan & Hartson, LLP

(57) ABSTRACT

A character image layout method lays out n lines ($2 \leq n \leq m$) out of m lines of character string images ($m \geq 2$) through any of uniform layout processing, left end alignment processing, right end alignment processing, center alignment processing, scale-up processing and scale-down processing. The character image layout method includes a reference line-selecting process for selecting a desired one of n lines of character string images as a reference line and an other line layout process for determining the range of the length of a character string image on the reference line as a layout range to lay out each character string image on each of other lines, within the layout range. In the other line layout process, when the length of a character string image on any of the n lines to be laid out is longer than that of the layout range, the any of the n lines to be laid out is reduced in size through the scale-down processing and laid out in the layout range.

27 Claims, 34 Drawing Sheets

F I G. 1 1
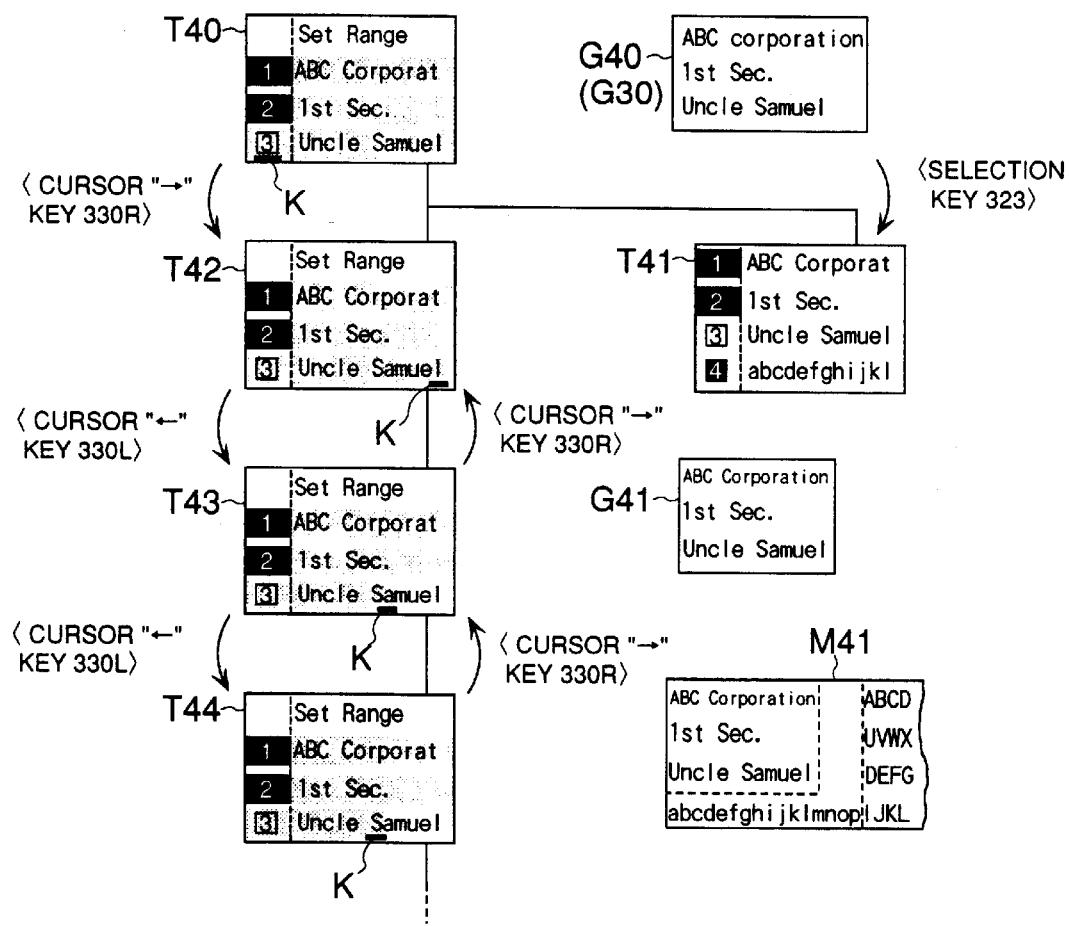

FIG. 12A

ABC Corporation
1st Sec.
Uncle Samuel
abcdefghijklmnop

FIG. 12B

ABC Corporation
1st Sec.
Uncle Samuel
abcdefghijklmnop

FIG. 12C

ABC Corporation
1st Sec.
Uncle Samuel
abcdefghijklmnop

FIG. 12D

ABC Corporation
1 st    Sec.
Uncle Samuel
abcdefghijklmnop

FIG. 12E

ABC Corporation
  1st Sec.
Uncle Samuel
abcdefghijklmnop

FIG. 12F

ABC Corporation
      1st Sec.
Uncle Samuel
abcdefghijklmnop

FIG. 14A

ABC Corporation
1st Sec.
Uncle Samuel
abcdefghijklmnop

FIG. 14B

ABC Corporation

1st Sec.

Uncle Samuel abcdefghijklmnop

FIG. 14C

ABC Corporation

1st Sec.

Uncle Samuel abcdefghijklmnop

FIG. 18A

```
ABC Corporation
1st Sec.
Uncle Samuel
abcdefghijklmnop
```

FIG. 18B

```
ABC Corporation
1st Sec.
Uncle Samuel
abcdefghijklmnop
```

FIG. 18C

```
ABC Corporation

1st Sec.
Uncle Samuel
abcdefghijklmnop
```

F I G. 1 9
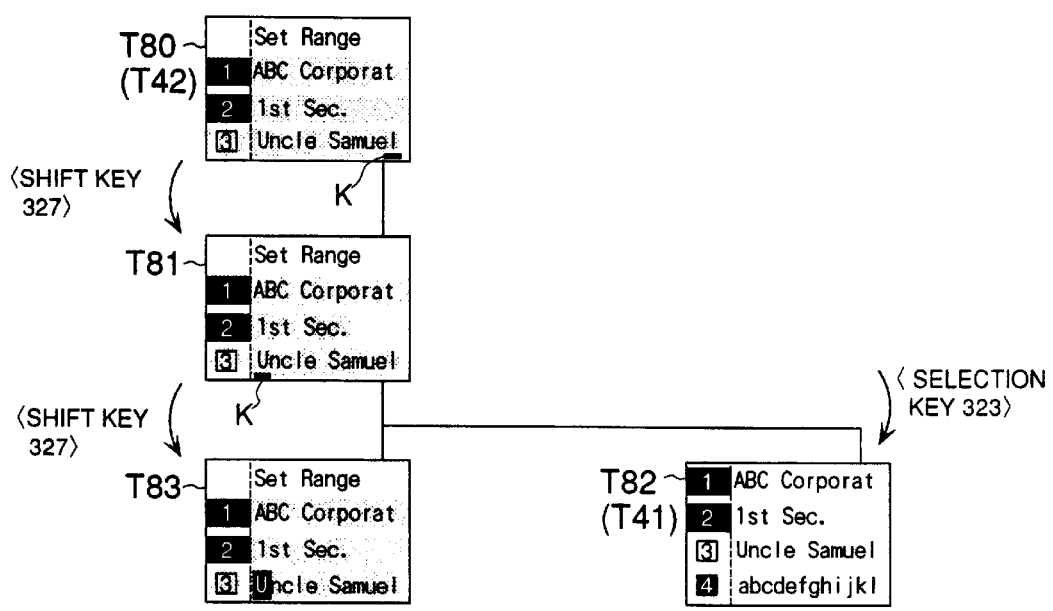

FIG. 22A

ABC Corporation
1st Sec.
Uncle Samuel
abcdefghijklmnop

FIG. 22B

ABC Corporation
1st Sec.
Uncle Samuel

FIG. 22C

ABC Corporation
1st Sec.
Uncle Samuel

FIG. 22D

ABC Corporation
1st Sec.
Uncle Samuel

FIG. 24A

ABC Corporation
1st Sec.
Uncle Samuel
abcdefghijklmnop

FIG. 24B

ABC Corporation

1st Sec.
Uncle Samuel

FIG. 26A

ABC Corporation
1st Sec.
Uncle Samuel

FIG. 26B

ABC Corporation
1 st    Sec.
Uncle Samuel

FIG. 26C

ABC Corporation
1st Sec.
Uncle Samuel

FIG. 26D

ABC Corporation
1    st    Sec.
Uncle Samuel

PRIOR ART

FIG. 34A

| ABC Corporation |
| 1   st     Sec. |
| Uncle Samuel |

FIG. 34B

| ABC Corporation |
| 1st Sec. |
| Uncle Samuel |

FIG. 34C

| ABC Corporation |
| 1st Sec. |
| Uncle Samuel |

FIG. 34D

| ABC Corporation |
| 1st Sec. |
| Uncle Samuel |

CHARACTER IMAGE LAYOUT METHOD AND DEVICE

BACKGROUND OF THE INVENTION

1. Field of the Invention

This invention relates to a method and device for laying out a plurality of lines of character string images comprised of images of characters, such as letters and symbols, in a desired layout range, to obtain a print image for printing on a tape to form a label or the like and a stamp image for engraving on the stamping face of a stamp.

2. Prior Art

In word processors and the like, there have been conventionally employed a technique called "line appearance modification" for laying out characters of a character string within a range defined by the width of a printing paper or a range (layout range) designated by ruled lines. Typical methods of the line appearance modification are "uniform layout" for arranging character images on each line at equal space intervals of space, "left end alignment" for aligning the left end of each line, "right end alignment" for aligning the right end of each line, and "center alignment" (centering) for aligning the center of each line.

The layout methods of the above mentioned kinds used in the word processors and the like can be also applied to a stamp making method to lay out stamp images with reference to a predetermined size of the stamping face of each stamp. Similarly, these layout methods can be applied to a tape printing apparatus, for arranging print images with reference to a length of fixed length printing set by the user. On the other hand, for the tape printing apparatus, there has also been proposed a method of the line appearance modification which determines a layout range therefor with reference to the longest line of a plurality of lines of character strings when the fixed length printing is not carried out (see FIG. 34).

In the tape printing apparatus, however, there is a case where a particular one of a plurality of lines, such as a line of a menu title or a name of a person or firm in a label, is desired to be made conspicuous. However, when such a particular line is not the longest one, the line cannot be made conspicuous so long as the line appearance modification is carried out with reference to the longest line.

Further, in order to make a line of interest conspicuous in the cases of a layout range being determined with reference to the length of fixed length printing set in advance, it is required to take into account the layout, the arrangement, and the scale up/down ratio not only of the line of interest but also of the other lines. Conventionally, manual calculation has been only means for obtaining values of settings for realizing them, which requires troublesome and time-consuming operations.

The second-mentioned problems concerning the fixed length printing are commonly encountered by a stamp making apparatus. In the case of the stamp making apparatus, the stamping face of a stamp has a predetermined limited size and the number of characters on each line is small. For this reason, a line desired to be particularly conspicuous and a line desired to be inconspicuous can be much more different in layout from each other, which presents a critical problem to the stamp making apparatus.

SUMMARY OF THE INVENTION

It is an object of the invention to provide a character image layout method and device which is capable of laying out character images through simple operations by setting a desired one of a plurality of lines of character string images to a reference line.

To attain the object, according a first aspect of the invention, there is provided a method of laying out character images by carrying out layout processing on n lines ($2 \leq n \leq m$) out of m lines ($m \geq 2$) of character string images, the method comprising the steps of:
selecting a desired one of the n lines of character string images as a reference line;
carrying out the layout processing on the n lines of character string images in a manner such that the n lines of character string images are laid out to a layout range defined as a predetermined range of length of the reference line; and
carrying out scale-down processing on a character string image of any of the n lines in a manner such that the character string mage is reduced to be adapted in size to the layout range, if a length of the character string image of the any of the n lines of character string images is longer than a length of the layout range.

To attain the above object, according to a second aspect of the invention, there is provided a character image layout device for laying out character images by carrying out layout processing on n lines ($2 \leq n \leq m$) out of m lines ($m \geq 2$) of character string images, the character image layout device comprising:
a reference line-selecting section for selecting a desired one of the n lines of character string images as a reference line;
a layout section for carrying out the layout processing on the n lines of character string images in a manner such that the n lines of character string images are laid out to a layout range defined as a predetermined range of length of the reference line; and
a scale-down processing section for carrying out scale-down processing on a character string image of any of the n lines in a manner such that the character string mage is reduced to be adapted in size to the layout range, if a length of the character string image of the any of the n lines of character string images is longer than a length of the layout range.

According to the above character image layout method and device, n lines ($2 \leq n \leq m$) out of m lines of character string images ($m \geq 2$) are designated as lines to be laid out, and a desired line is selected from the n lines as a reference line for carrying out a character image layout operation to set the range of a full length of a character string image on the reference line to a layout range, whereby each character string image on the other lines is laid out within the layout range. In this process, if the length of a character string image on any of the lines to be laid out is longer than the length of the layout range, character images on the line are reduced in size to lay out the resulting character images within the layout range.

That is, since a line of interest can be selected as a reference line, and at the same time, character images on a line longer than the reference line are reduced in size, each character image on the reference line can be made conspicuous than the character images on the longer lines. Further, the user is only required to select the reference line to carry out the above processes, and hence it is possible to lay out character string images in a desired layout range by the simple operation.

Preferably, the method includes the step of designating a range of length of an image of at least one character on the reference line as the layout range.

Preferably, the character image layout device includes a layout range-designating section for designating a range of length of an image of at least one character on the reference line as the layout range.

According to these preferred embodiments, n lines ($2 \leq n \leq m$) out of m lines of character string images ($m \geq 2$) are designated as lines to be laid out, and a desired one of the n lines is selected as a reference line for carrying out a character image layout operation, similarly to the above. Typically, however, not the full length of the reference line but a range of a length of part of the character string image on the reference line is designated as a layout range, and each character string image on the other lines is laid out within the layout range.

That is, not the whole reference line but part thereof is designated as a layout range for layout of the other lines, whereby it is possible to make a line of interest (reference line) more conspicuous and lay out or arrange character string images in various manners, without spoiling the simplicity of the layout operation. If the apparatus is configured such that this method and the method of designating the whole of a reference line as a layout range can be employed in combination, the apparatus further enables the user to lay out a desired one(s) of the lines other than the reference line (other line) in a layout range defined by the whole reference line (the full layout range), as well as lay out the other desired line (s) in a layout range defined by part of the reference line (the partial layout range).

Preferably, the layout processing includes uniform layout processing for arranging character images of each character string image at equal space intervals, left end alignment processing for aligning a left end of each character string image with a left end of a predetermined range, right end alignment processing for aligning a right end of each character string image with a right end of a predetermined range, center alignment processing for aligning a center of each character string image with a center of a predetermined range, scale-up processing for expanding a size of each character image of a character string image in a manner such that a length of the character string image is made correspondent to a predetermined range, and the scale-down processing for reducing a size of each character image of a character string image in a manner such that a length of the character string image is made correspondent to a predetermined range.

More preferably, the step of carrying out the layout processing includes, when a length of a character string image on any of the n lines is equal to or shorter than the length of the layout range, laying out each character image of the character string image on the any of the n lines, within the layout range, by any of the uniform layout processing, the left end alignment processing, the right end alignment processing, the center alignment processing, and the scale-up processing.

More preferably, when a length of a character string image on any of the n lines is equal to or shorter than the length of the layout range, the layout processing section lays out each character image of the character string image on the any of the n lines, within the layout range, by a selected one of the uniform layout processing, the left end alignment processing, the right end alignment processing, the center alignment processing, and the scale-up processing.

According to these preferred embodiments, when a length of a character string image on any of the lines to be laid out is equal to or shorter than that of the layout range, each character image on the any of the lines to be laid out is laid out in the layout range through any of the uniform layout processing, the left end alignment processing, the right end alignment processing, the center alignment processing and the scale-up processing. That is, if only a line of interest is selected as the reference line, it is possible to carry out a line appearance modification process including the scale-up processing on character images on the other lines, character images can be laid out through the simple operation without designating a particular layout range therefor.

More preferably, the method further includes the step of selecting one of the uniform layout processing, the left end alignment processing, the right end alignment processing, the center alignment processing, and the scale-up processing, and the step of carrying out the layout process includes carrying out the selected one of the uniform layout processing, the left end alignment processing, the right end alignment processing, the center alignment processing, and the scale-up processing.

More preferably, the character image layout device further includes a layout processing-selecting section for selecting one of the uniform layout processing, the left end alignment processing, the right end alignment processing, the center alignment processing, and the scale-up processing, and the layout processing section carrying out the selected one of the uniform layout processing, the left end alignment processing, the right end alignment processing, the center alignment processing, and the scale-up processing.

According to these preferred embodiments, when a length of a character string image on any of the lines to be laid out is equal to or shorter than that of the layout range, it is possible to select any of the layout processing except for the scale-down processing, which makes it easy to arrange (lay out) a character string image whose length is equal to or shorter than that of the layout range as the user desires.

Preferably, the method further includes the step of carrying out a setting concerning whether or not the scale-down processing is automatically carried out, when a character string image on any of the lines to be laid out is longer than the length of the layout range.

Preferably, the character image layout device further includes a scale-down processing setting section for carrying out a setting concerning whether or not the scale-down processing is automatically carried out, when a character string image on any of the lines to be laid out is longer than the length of the layout range.

According to these preferred embodiments, the apparatus is configured such that the user can select whether or not a line to be laid out which is longer than the length of the layout range is to be automatically reduced in size. In this process, if the automatic scale-down mode is set, it is made unnecessary to consider the layout or arrangement of the line to be laid out as well as a scale up/down ratio for scaling up or down the size of the line, which saves the trouble of carrying operations for considering or setting them. On the other hand, if the apparatus is configured such that the automatic scale down of a line to be laid out is not carried out, it is possible to prevent an unexpected line from being reduced in size and select a layout method and a scale up/down ratio as the situation requires. Thus, the usefulness and operability of the apparatus are enhanced.

Preferably, the method further includes the step of carrying out notification when any of the n lines of character string images is longer than the layout range.

Preferably, the character image layout device further includes a notification section for carrying out notification when any of the n lines of character string images is longer than the layout range.

According to these preferred embodiments, when the length of a character string image on any of the lines to be laid out is longer than the length of its layout range, the user is notified of the any of the lines to be laid out. That is, the notification enables the user to easily know that a character string image on the line to be laid out is longer than that of the range of the layout range. Therefore, when the automatic layout process is carried out, the user is permitted to deal with an undesired layout more quickly, whereas when the automatic layout process is not effected, the display mode makes it easier to prevent an unexpected or undesired layout from being effected.

Preferably, the method further includes the steps of:

setting an arbitrary length as a length of a range of a fixed length; and laying out each character image on the reference line by at least one of the scale-up processing or the scale-down processing, and the uniform layout processing in a manner such that the length of the character string image on the reference line is made equal to the length of the range of the fixed length, the layout range being determined based on the character string image on the reference line having the each character image laid out thereon.

Preferably, the character image layout device further includes:

a fixed line-setting section for setting an arbitrary length as a length of a range of a fixed length; and a reference line layout section for laying out each character image on the reference line by at least one of the scale-up processing or the scale-down processing, and the uniform layout processing in a manner such that the length of the character string image on the reference line is made equal to the length of the range of the fixed length, the layout range being determined based on the character string image on the reference line having the each character image laid out thereon.

According to these preferred embodiments, a length of a range of a fixed length is set, and each character image on the reference line is laid out such that the length of the character string image on the reference line becomes equal to the length of the range of the fixed length. That is, it is possible not only to make a line of interest conspicuous as a reference line but also to set the length of the line of interest.

More preferably, the method further includes the step of carrying out a setting concerning whether or not the each character image on the reference line is automatically laid out so as to make the length of the character string image equal to the length of the range of the fixed length.

More preferably, the character image layout device further includes a reference line layout-setting section for carrying out a setting concerning whether or not the each character image on the reference line is automatically laid out so as to make the length of the character string image equal to the length of the range of the fixed length.

According to these preferred embodiments, it is selected whether or not the character string image on the reference line is to be automatically laid out. In this case, if an automatic layout mode is set, it is made unnecessary to consider the layout or arrangement of the reference line within the range of the fixed length and a scale up/down ratio for scaling up or down the size of the reference line, so that trouble of carrying out operations for setting them can be saved. On the other hand, if the apparatus is configured such that the automatic layout is not carried out, it is possible to prevent an unexpected or undesired layout from being effected and select a layout method and a scale up/down ratio as the situation requires. Thus, the usefulness and operability of the apparatus are enhanced.

More preferably, the method further includes the step of carrying out notification when the length of the character string image on the reference line is longer than the length of the range of the fixed length, before laying out the each character image on the reference line so as to make the length of the character string image equal to the length of the range of the fixed length.

More preferably, the character image layout device further includes a notification section for carrying out notification when the length of the character string image on the reference line is longer than the length of the range of the fixed length, before laying out the each character image on the reference line so as to make the length of the character string image equal to the length of the range of the fixed length.

According to these preferred embodiments, when the length of the reference line before being laid out is longer than that of the range of the fixed length, the user is notified of the reference line being longer than the length of the range of the fixed length. That is, the notification enables the user to easily know that the character string image on the reference line is longer than the length of the range of the fixed length. Hence, when the automatic layout is carried out, the notification enables the user to deal with an unexpected or undesired layout more quickly, whereas when the automatic layout process is not effected, the notification makes it easier to prevent an unexpected or undesired layout from being effected.

Preferably, the method further includes the step of selecting the n lines out of the m lines of character string images as lines to be laid out.

Preferably, the character image layout device further includes a layout line-selecting section for selecting the n lines out of the m lines of character string images as lines to be laid out.

According to these preferred embodiments, n lines are selected from m lines of character string images as lines to be laid out. That is, n lines can be selected from character string images comprised of m lines in total to lay out the same by the above mentioned character image layout method and device. This enables one or plurality of lines which were not selected as part of the n lines to be maintained in an original state thereof (in an original arrangement thereof) or to be arranged by another layout method. Further, after the arrangement, it is possible to additionally lay out some of the arranged lines by still another layout method. Therefore, the character image layout method and device according to the invention can be applied to wider range of uses.

More preferably, the step of selecting the n lines includes the step of designating n consecutive lines out of the m lines of character string images by range selection.

More preferably, the layout line-selecting section includes means for designating n consecutive lines out of the m lines of character string images by range selection.

According to these preferred embodiments, n consecutive lines are designated out of the m lines of character string images as lines to be laid out, by range selection on the display screen. This enhances the usefulness and operability of the apparatus.

More preferably, the step of selecting the n lines includes the step of designating lines to be laid out by marking n desired lines out of the m lines of character string images.

More preferably, the layout line-selecting section includes means for designating lines to be laid out by marking n desired lines out of the m lines of character string images.

According to these preferred embodiments, n desired lines out of the m lines of character string images are marked as lines to be laid out, which makes it possible to select n lines as ones to be lines to be laid out through simple operations, even when they are not consecutive lines. This further increases the usefulness and operability of the apparatus.

The above and other objects, features, and advantages of the invention will become more apparent from the following detailed description taken in conjunction with the accompanying drawings.

BRIEF DESCRIPTION OF THE DRAWINGS

FIG. 11 is a diagram showing an example of a sequence of screens displayed during execution of a layout range-setting process at step S17 in FIG. 6 and operations each carried out to display the following or preceding screen in the sequence;

FIG. 12A is a diagram illustrating an image of character string image data, which shows lines to be laid out and a reference line to be selected in the character image layout process;

FIGS. 12B to 12F are diagrams showing examples of images of respective character string image data items formed by the character image layout process.

FIGS. 14A to 14C are diagrams similar to FIGS. 12A to 12F, which show other examples of images of respective character string image data items created by the FIG. 13 layout range-setting process;

FIGS. 18A to 18C are diagrams similar to FIGS. 12A to 12F, which show other examples of images of respective character string image data items formed by the FIG. 17 layout range-setting process;

FIG. 19 is a diagram similar to FIG. 13, which shows still another example of a sequence of screens displayed during the layout range-setting process;

FIGS. 22A to 22D are diagrams similar to FIGS. 12A to 12F, which show other examples of images of respective character string image data items formed by the layout range-setting processes show in the FIGS. 19 to 21;

FIGS. 24A and 24B are diagrams similar to FIGS. 12A and 24B, which show another example of an image of a character string image data item formed by the FIG. 23 layout range-setting process;

FIGS. 26A to 26D are diagrams similar to FIGS. 12B to 12F, which show other examples of images of respective character string image data items formed by the FIG. 25 layout range-setting process;

FIGS. 34A to 34D are diagrams showing examples of character string images arranged by conventional layout methods.

DETAILED DESCRIPTION

The invention will now be described in detail with reference to drawings showing an embodiment thereof. In this embodiment, a method and device for laying out character images according to the invention are applied to a tape printing apparatus.

Figure 1:
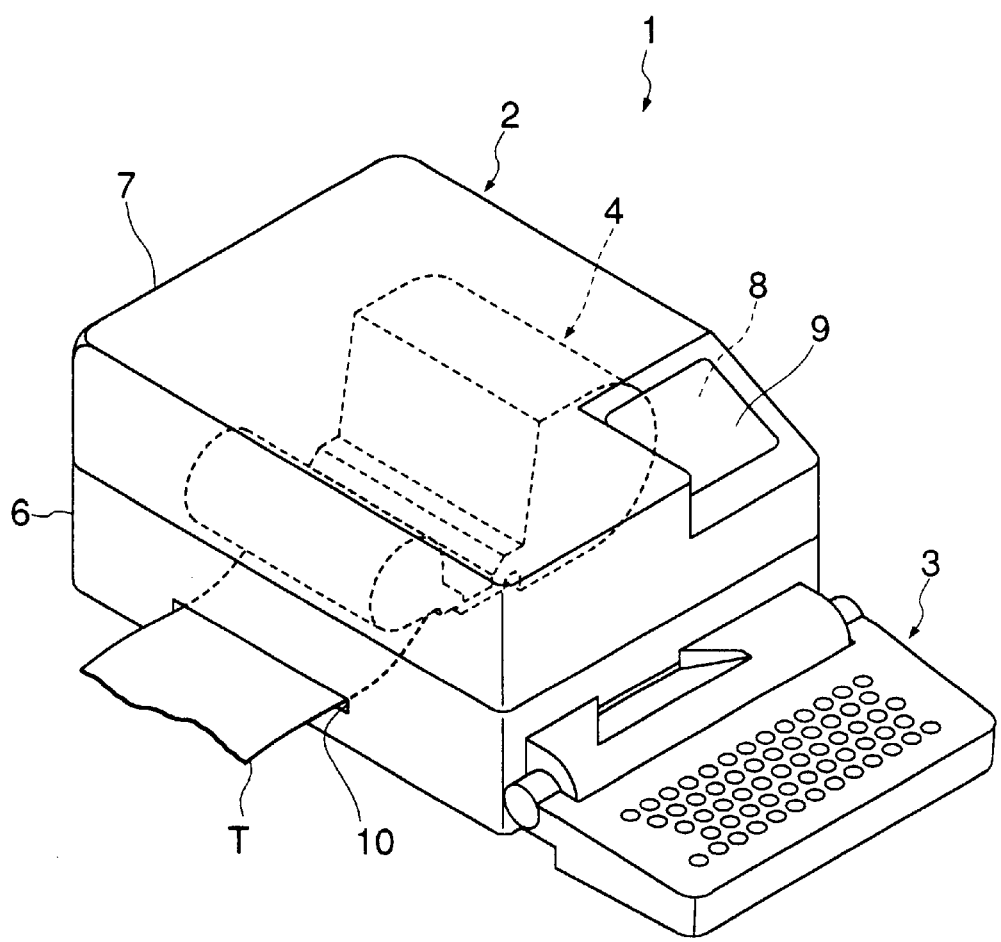
FIG. 1 is a perspective view of an appearance of a tape printing apparatus according to an embodiment of the invention.
Figure 2:
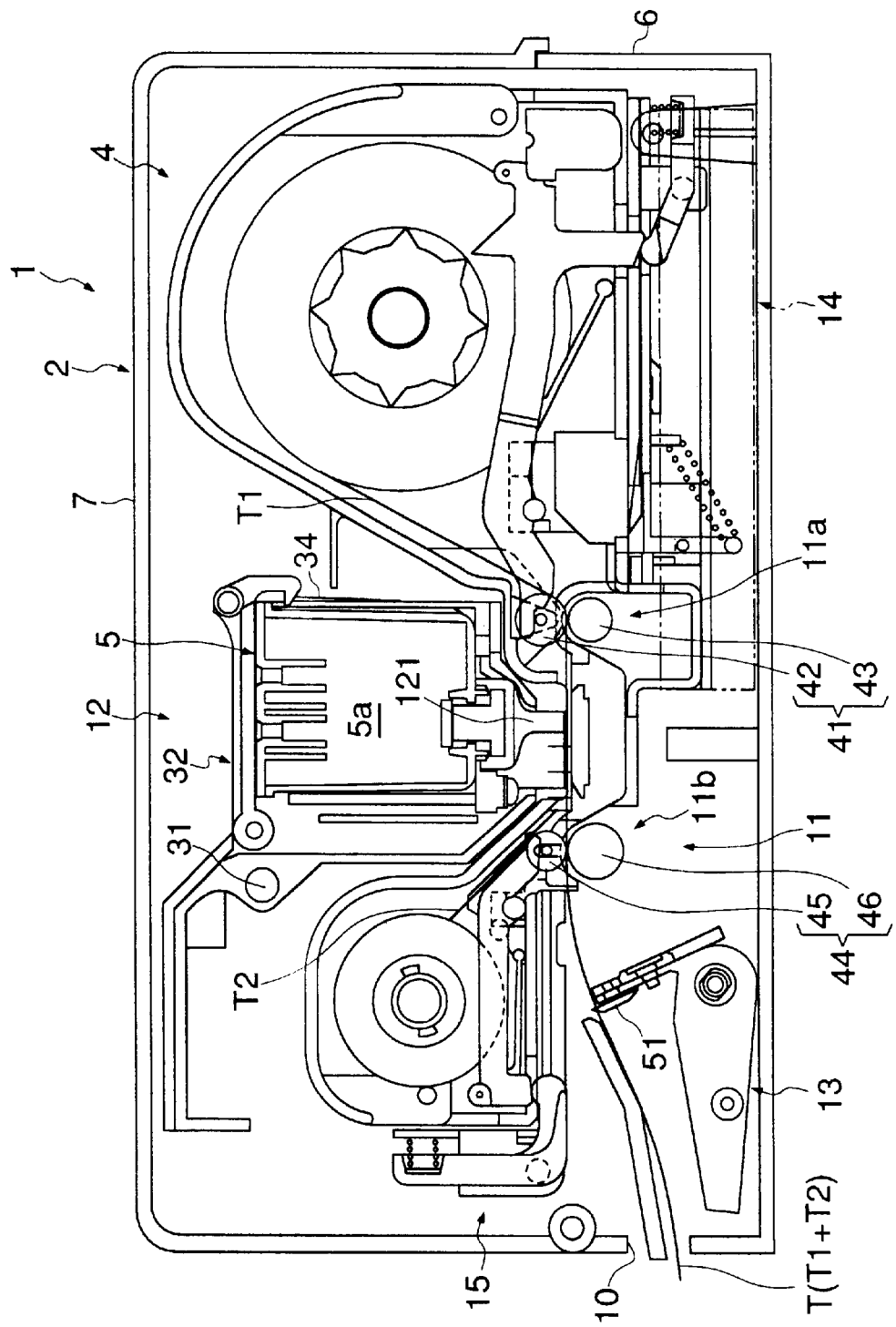
FIG. 2 is a cross-sectional view of a body of the FIG. 1 tape printing apparatus.

FIG. 1 is a perspective view of an appearance of the tape printing apparatus, and FIG. 2 is a cross-sectional view of a body of the tape printing apparatus. The tape printing apparatus 1 is capable of carrying out color printing of a print image on a printing tape Ti by an ink jet printing method as well as cutting off the printed portion of the printing tape Ti to thereby produce a label. The print image is formed according to entered desired characters and the like.

Further, the tape printing apparatus 1 is capable of mounting not only the printing tape T1 but also a laminating tape T2 to thereby affix the laminating tape T2 to a printed portion of the printing tape T1 and cut the printing tape T1. and the laminating tape T2 in the laminated state, for producing a laminated label. Hereinafter, a type of tape formed of only the printing tape T1 and a type of tape formed of both the printing tape T1 and the laminating tape T2 (to be) added thereto will be generically referred to as "the tape T".

The printing tape T1 is comprised of a substrate tape, an adhesive layer coated on a underside surface of the substrate tape, and a release paper tape affixed to the adhesive layer. The substrate tape is formed of a material which is capable of readily absorbing ink, such as paper, paper with a coated layer or a film with a coated layer. The adhesive layer is used for affixing a printing tape T1 as a label to an object article, such as a file, while the release paper tape is used for preventing dust or dirt from depositing on the adhesive layer.

On the other hand, the laminating tape T2 is comprised of a substrate tape, and an adhesive layer coated on a underside surface of the substrate tape. The substrate tape is formed of a transparent film having a thickness of approximately 16 to 38 μm. The printing tape T1 and the laminating tape T2 are generally fabricated to have identical widths and affixed to each other in a manner such that side ends thereof are aligned one upon the other. Actually, the laminating tape T2 has a slightly smaller width (by approximately 0.3 mm) than the printing tape T2 such that slight lateral displacement of the laminating tape T2 can be accommodated when the same is affixed to the printing tape T1.

Tape cartridges are provided that contain various (approximately ten) kinds of tapes T with various tape widths of from 4.5 mm to 96 mm. A print image having a resolution of 24 to 1024 dots in the direction of the width thereof is printed on the printing tape T in a manner dependent on the width thereof. It should be noted that there are provided still other tapes T different in material or having background colors other than white. Therefore, it is possible to use at least several tens of kinds of tapes T including ones to be adopted in the future.

The tape cartridges 4 are classified into a type which contains both a printing tape T1 and a laminating tape T2 and another type which contains only a printing tape T1 (see FIG. 3), and each include three kinds of tape cartridges, such as "large", "medium" and "small", different in width.

Referring to FIGS. 1 and 2, the tape printing apparatus 1 is comprised of an apparatus body 2, a keyboard 3 mounted on a front-side portion of the apparatus body 2, a tape cartridge 4 containing a tape T (printing tape T1+laminating tape T2), and an ink cartridge 5 filled with four colors of ink. The tape cartridge 4 and the ink cartridge 5 are removably loaded in the apparatus body 2.

The apparatus body 2 has an apparatus casing 6 upper part of which is formed by a lid 7 which can be opened and closed for inserting and removing (i.e. loading and unloading) the tape cartridge 4 and the ink cartridge 5. In a side wall of the apparatus casing 6 is formed a tape exit 10 in the form of a slit through which the tape T is sent out of the apparatus.

Inside the apparatus casing 6 there are mounted a tape-feeding block 11 for feeding the tape T (the printing tape T1 and the laminating tape T2) and at the same time attaching the laminating tape T2 to the printing tape T1, a printer block 12 for effecting color printing on the printing tape T1, a cutter block 13 for cutting off a printed portion off the tape T, a latching mechanism 15 for setting the tape cartridge 4 in the tape printing apparatus, and a circuit board 14.

On the circuit board 14 are mounted not only batteries, such as nicad batteries, and a power supply unit but also each circuit of a control block 200, described hereinafter, for controlling respective blocks of the tape printing apparatus 1 (see FIG. 4).

The printer block 12 includes a carriage guide shaft 31 having opposite ends (front and rear ends if shown in FIG. 1) thereof supported on a frame, not shown, a carriage 32 slidably attached to the carriage guide shaft 31, a timing belt, not shown, which is driven in a forward or reverse direction to move the carriage 32 in the direction of the width of the printing tape T1 in a reciprocating manner, and a carriage motor (CR motor) 122 (see FIG. 4) for driving the timing belt in a forward or reverse direction.

On the carriage 32 are integrally mounted an ink jet head 121 for printing on the tape T, at a lower portion thereof, and a cartridge holder 34 at an upper portion of the same, for holding therein the ink cartridge 5 for supplying ink to the ink jet head 121. In this case, the ink jet head 121 is mounted on the carriage 32 in a manner facing downward, and the ink cartridge 5 is held in the cartridge holder 34 in a manner facing downward.

When the ink cartridge 5 is loaded in the cartridge holder 34, ink from the ink cartridge 5 is allowed to flow from four ink tanks 5a to the ink jet head 121. The ink tanks 5a are filled with respective yellow, cyan, magenta and black inks.

Further, the carriage 32 has light shields, not shown, projecting therefrom. When one of the light shields is brought before an associated one of position-detecting sensors 98 (see FIG. 4) each comprised of a photo interrupter or the like, the ink jet head 121 is detected to be at a home position, not shown, whereby the correction of the position of the ink jet head 121, such as zero point adjustment, is carried out.

The home position serves not only as a standby position of the ink jet head 121 but also as a reference position for printing. The CR motor 122 is driven for rotation in a predetermined number of steps from the reference position, whereby the carriage 32 is moved with accuracy to each position in the direction of the width of the tape T within a printing range, and the ink jet head 121 is driven in synchronism with movement of the carriage 32 to thereby effect printing of characters and figures on a surface of the tape T in a desired manner.

Figure 3:
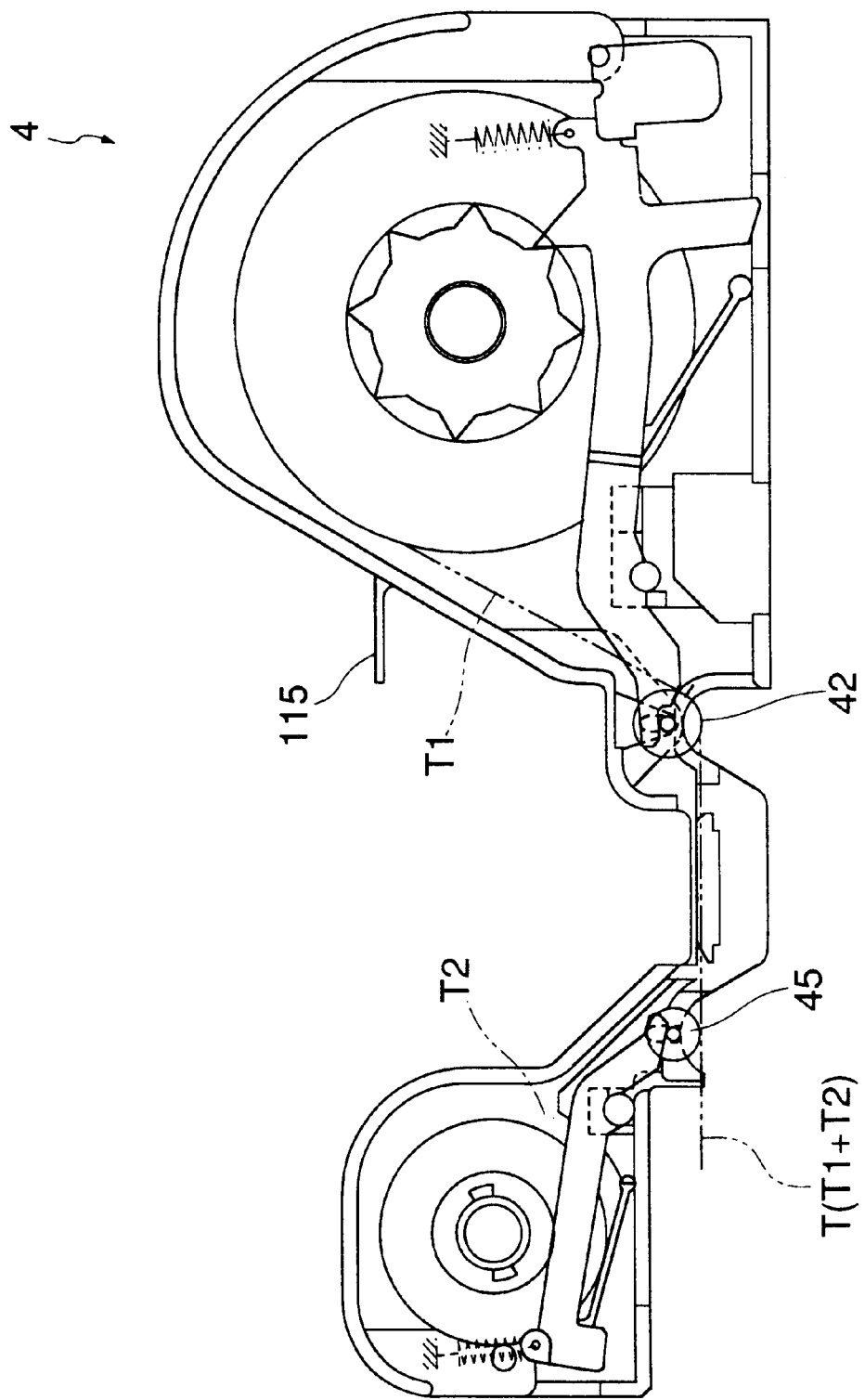
FIG. 3 is a side cross-sectional view of an example of a tape cartridge mounted in the FIG. 1 tape printing apparatus.

The tape cartridge 4 includes a discriminating plate 115 for designating discriminating information based on bit patterns or the like (see FIG. 3). A discriminating sensor 99 (see FIG. 4) mounted on the above-mentioned carriage 32 is caused to face toward the discriminating plate 115 to thereby detect the types of a tape cartridge 4, a printing tape T1 and a laminating tape T2 as well as a print-starting position at which the printing tape T1 starts to be printed. Hereinafter, signals indicative of the sensed types and print-starting position are referred to as "the tape-discriminating signals".

Further, the printer block 12 includes a head cap mechanism, not shown, for closing ink nozzles of the ink jet head 121 as well as cleaning the same by using a pump motor 123 (see FIG. 4) as required.

The tape feed block 11 has a printing tape feed mechanism 11a and a laminating tape feed mechanism 11b arranged on opposite sides of the printer block 12 in the direction of feeding of the tape T. The printing tape feed mechanism 11a includes feed roller means 41 comprised of a feed driven roller 42 positioned above and a feed drive roller 43 positioned below and a tape feed motor 111 (PF motor) (see FIG. 4) for driving the feed drive roller 43 for rotation.

The feed drive roller 43 is arranged in the apparatus body 2 of the tape printing apparatus, while the feed driven roller 42 is arranged in the tape cartridge 4. When the tape cartridge 4 is loaded in the apparatus body 2, the printing tape T1 is pressed between the feed driven roller 42 and the feed drive roller 43. In this state, the tape feed motor is driven for rotation to thereby send the printing tape T1 sandwiched between the feed driven roller 42 and the feed drive roller 43.

The laminating tape feed mechanism 11b includes a pair of laminating rollers 44 comprised of a laminating driven roller 45 at an upper position and a laminating drive roller 46 at a lower position and a laminating motor, not shown, for rotating the laminating drive roller 46. The laminating motor and the above-mentioned tape feed motor are implemented by an identical or single motor (PF motor 111), and the torque or turning force from this motor is transmitted by a reduction gear train, not shown, in a manner bifurcated to the feed rollers 41 and the laminating rollers 44.

The laminating drive roller 46 is arranged in the apparatus body 2, while the laminating driven roller 45 is arranged in the tape cartridge 4. When the tape cartridge 4 is loaded in the apparatus body 2, the printing tape T1 and the laminating tape T2 are pressed between the laminating driven roller 45 and the laminating drive roller 46. In this state, the laminating motor rotates to attach the laminating tape T2 to the printing tape T1 using the pressure between the laminating driven roller 45 and the laminating drive roller 46 while sending forward the resulting laminated tape.

The cutter block 13 includes a cutter 51 and a cutter motor 131 (see FIG. 4) for driving the cutter 51 for cutting operations. After completion of the printing operation, the tape T (the printing tape T1+the laminating tape T2) is sent by the PF motor 111 for incremental feed over a predetermined distance, and then stopped, whereupon the cutter motor 131 is driven to cut off the tape T. It should be noted that the tape printing apparatus I is provided with a cut key 340 for enabling the user to manual cut the tape by key stroke, and it is possible to switch between an automatic cutting mode and a manually cutting mode.

As shown in FIG. 1, in this embodiment, the keyboard 3 is attached to the apparatus body 2 such that the keyboard 3 can be selectively brought to a vertical position or to a horizontal position. When the apparatus is used for printing, the keyboard 3 is brought to the horizontal position, whereas when the same is carried by the user, the keyboard 3 is brought to the vertical or folded position. In a right-side front portion of the lid 7 is formed a small window 9 which, when the lid 7 is closed, corresponds in position to a liquid crystal display block 8 incorporated in the apparatus body 2. The keyboard 3 and the liquid crystal display block 8 will be described in more detail in the following description of a control system of the apparatus 1.

Next, the basic configuration of the control system of the tape printing apparatus 1 will be described with reference to FIG. 4. The control system is basically comprised of the control block 200, the keyboard 3, the position-detecting sensors 98, the discriminating sensor 99, a driving circuit block 280 and the liquid crystal display block 8.

The position-detecting sensor 98 detects that the ink jet head 121 has reached the home position, as described above, to generate a signal (position-detecting signal) indicative of the sensed position, which is supplied to the control block 200. The discriminating sensor 99 detects the types of the tape cartridge 4 and the tape T as well as the print-starting position, to generate signals (tape-discriminating signals) indicative of the sensed types and print-starting position, which are also supplied to the control block 200.

The driving circuit 280 includes a head-driving circuit 281, a motor-driving circuit 282, and a liquid crystal display-driving circuit 283. The head-driving circuit 281 drives the ink jet head 121 of the printer block 12 in response to control signals delivered from the control block 200, i.e. in accordance with commands carried by the signals. Similarly, the motor-driving circuit 282 drives the CR motor 122 and the pump motor 123 of the printer block 12, the PF motor 111 of the tape feed block 11, and the cutter motor 131 of the cutter block 13 in response to respective commands from the control block 200. Similarly, the liquid crystal display-driving circuit 283 controls the liquid crystal display block 8 in response to a command from the control block 200.

The liquid crystal display block 8 has a display screen 81 which is capable of displaying display image data of 96×64 dots on a rectangular display area of approximately 6 cm in the transverse direction (X direction)×4 cm in the longitudinal direction (Y direction). The liquid crystal display block 8 is used by the user to enter data via the keyboard 3 to form or edit character string image data and print image data, view the resulting data, and enter various commands including ones for selections via the same.

On the keyboard 3 there are arranged a character key group 310 including an alphabet key group 311, a symbol key group 312, a number key group 313, and a nonstandard character key group 315 for calling nonstandard characters for selection as well as a function key group 320 for designating various operation modes. In a type of the apparatus which is capable of entering the Japanese language, there is also provided a kana key group 314 for entering Japanese hirakana letters and Japanese katakana letters.

The function key group 320 includes a power key 321, a print key 322 for instructing a printing operation, a selection key 323 for finally determining entry of character data and feeding lines during text entry as well as selecting modes on a selection screen, a color specification key 324 for specifying printing colors and its neutral color (mixed color) of print image data, a color-setting key 325 for setting colors of characters and background colors, and four cursor Keys 330 (330U, 330D, 330L, 33OR: hereinafter referred to as "the cursor "↑" key 330U" and the like) for moving the cursor or the display range of print image data on the display screen 81 in respective upward "↑", downward "↓", leftward "←", and rightward "→" directions.

The function key group 320 also includes a cancel key 326 for canceling instructions, a shift key 327 for use in changing roles of respective keys as well as modifying registered image data, an image key 328 for alternately switching between a text entry screen or a selection screen and a display screen (image screen) for displaying print image data, a proportion-changing (zoom) key 329 for changing a proportion between the size of print image data and the size of display image data displayed on the image screen, and the cut key 340 for manually cutting the tape T.

The function key group 320 further includes a style key 341 for use in selecting one of print format/style options, that is, for use in a layout process described hereinafter, as well as in selecting one of the print format/style options, such as options of a character size, an outer frame, a table arrangement and the like.

Similarly to keyboards of the general type, the above key entries may be made by separate keys exclusively provided therefor or by a smaller number of keys operated in combination with the shift key 327 or the like. Here, for purposes of ease of understanding, the following description will be made assuming that there are provided as many keys as described above.

Figure 4:
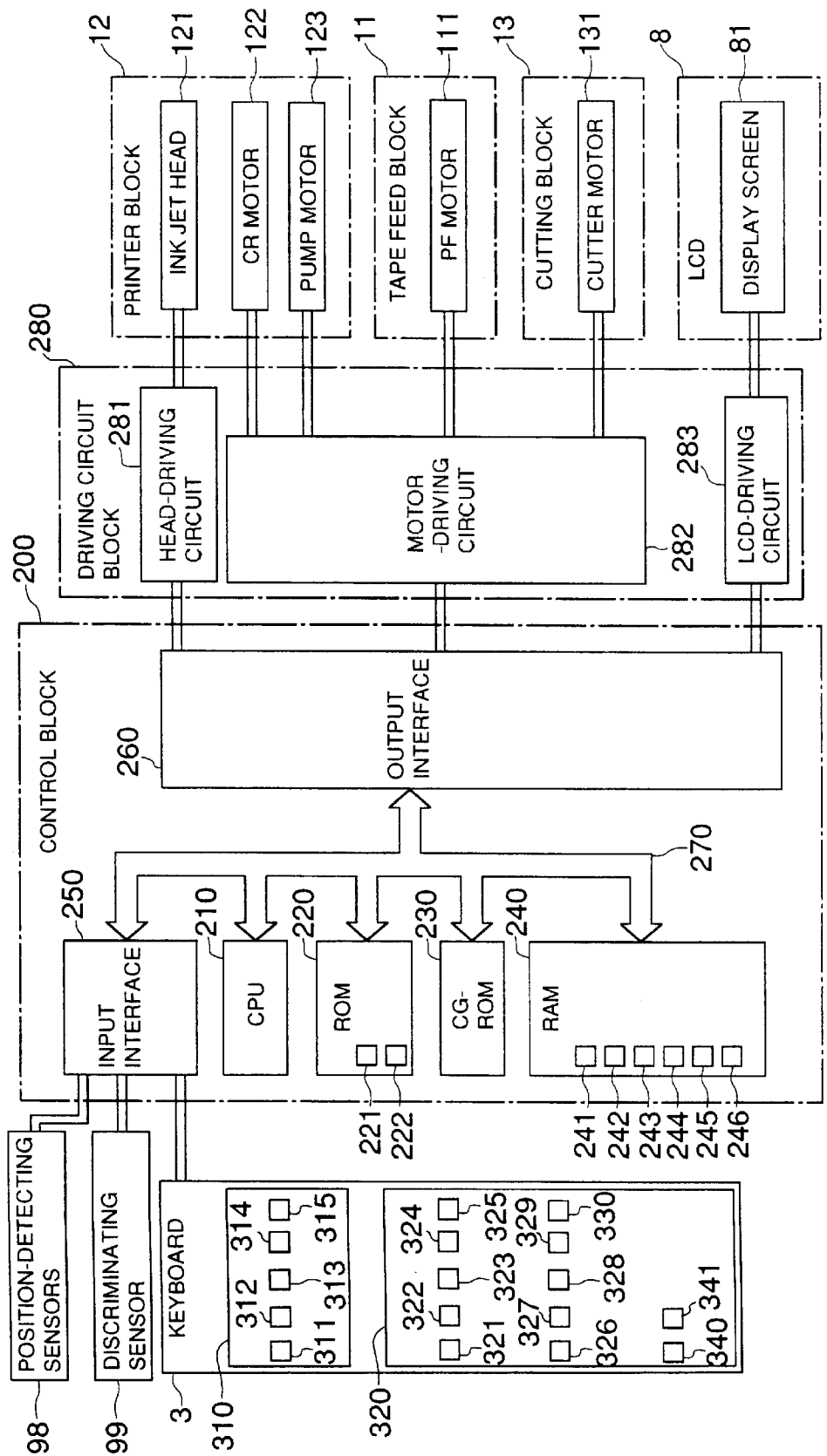
FIG. 4 is a block diagram schematically showing the arrangement of a control system of the FIG. 1 tape printing apparatus.

As shown in FIG. 4, from the keyboard 3, various commands described above and data are input to the control block 200.

The control block 200 includes a CPU 210, a ROM 220, a character generator ROM (hereinafter referred to as "the CG-ROK") 230, a RAM 240, an input interface 250, and an output interface 260, all of which are connected to each other by an internal bus 270.

The ROM 220 stores control programs executed by the CPU 210 as well as a color conversion table 221 and a character modification table 222. The CG-ROM 230 stores font data, i.e. data defining characters, symbols, figures and the like, provided for the tape printing apparatus 1. When code data for identifying a character or the like is input thereto, it outputs the corresponding font data.

The RAM 240 is supplied with power by a backup circuit, not shown, such that stored data items can be preserved even when the power is turned off by operating the power key 321. The RAM 240 includes areas of a register group 241, a text memory 242 for storing text data of letters or the like entered by the user via the keyboard 3, a displayed image data memory 243 for storing image data displayed on the display screen 81, a print image data memory 244 for storing print image data, a registered image data memory 245 for storing registered image data, as well as a conversion buffer memory 246 including a color conversion buffer. The RAM 240 is used as a work area for carrying out the control process.

The input interface 250 is a circuit which is connected to the keyboard 3, the position-detecting sensor 98, and the discriminating sensor 99, for receiving commands and data entered via the keyboard 3, the position-detecting signal generated by the position-detecting sensor 98 and the tape-discriminating signal generated by the discriminating sensor 99, and inputting these to the internal bus 270. The output interface 260 is a circuit for outputting data and control signals input to the internal bus 270 by the CPU 210 or the like to the driving circuit 280.

The CPU 210 of the control block 200 receives the commands and data input via the keyboard 3, the position-detecting signal from the position-detecting sensor 98 and the tape-discriminating signal from the discriminating sensor 99 via the input interface 250, according to the control program read from the ROM 220, processes font data from the CG-ROM 230 and various data stored in the RAM 240, and delivers control signals to the driving circuit 280 via the output interface 260 to thereby carry out position control during printing operations, discriminating control for discriminating the type of the tape T, the display control of the display screen 81, and the printing control that causes the ink jet head 121 to carry out color printing on the tape T under predetermined printing conditions. In short, the CPU 210 controls the overall operation of the tape printing apparatus 1.

Next, the overall control process carried out by the tape printing apparatus 1 will be described with reference to FIG. 5. As shown in the figure, when the program for carrying out the control process is started e.g. when the power of the tape printing apparatus 1 is turned on, first, at step S1, initialization of the system including restoration of saved control flags is carried out to restore the tape printing apparatus 1 to the state it was in before the power was turned off the last time. Then, the image that was displayed on the display screen 81 before the power was turned off the last time is shown as the initial screen at step S2.

Figure 5:
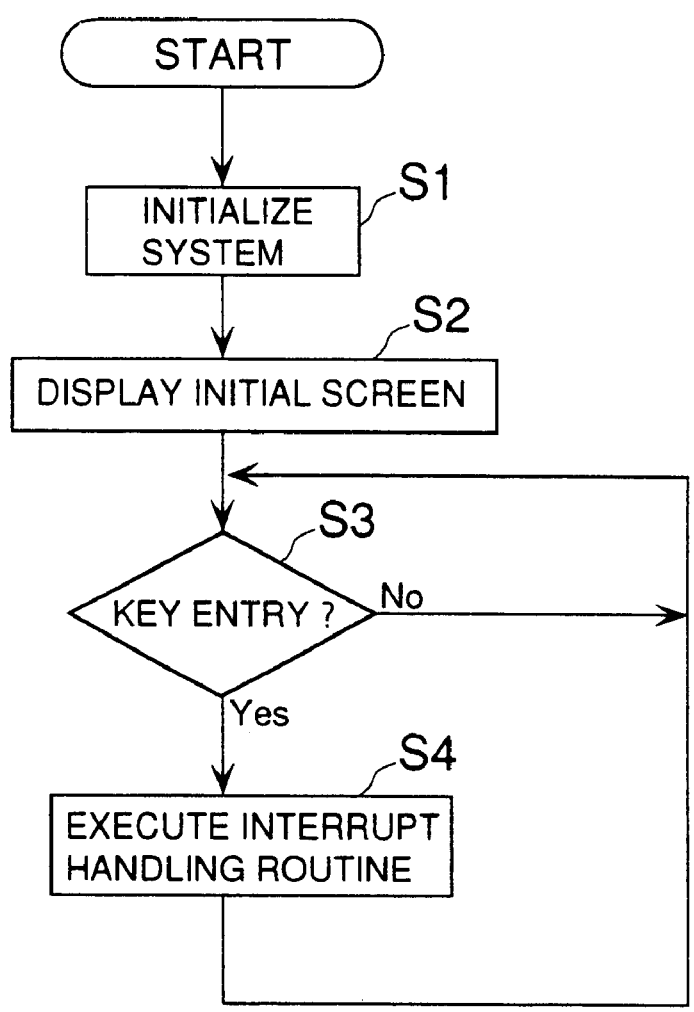
FIG. 5 is a flowchart showing an overall control process executed by the FIG. 1 tape printing apparatus.

The following steps in FIG. 5, that is, step S3 for determining whether or not a key entry has been made and step S4 for carrying out an interrupt handling operation are conceptual representations of actual operations. Actually, when the initial screen has been displayed at step S2, the tape printing apparatus 1 enables an interrupt by key entry (keyboard interrupt), and maintains the key entry wait state (No to S3) until a keyboard interrupt is generated. When the keyboard interrupt is generated (Yes to S3), a corresponding interrupt handling routine is executed at step S4, and after the interrupt handling routine is terminated, the key entry wait state is again enabled and maintained (No to S3).

As described above, in the tape printing apparatus 1, main processing operations by the apparatus are carried out by task interrupt handling routines, and hence if print image data for printing is provided or has been prepared, the user can print the image data at a desired time, by depressing the print key 322. Further, operating procedures up to the printing operation can be selectively carried out by the user as he desires.

Therefore, first, description is made of a case in which image data (character string image data) having character images arranged therein is printed as print image data.

In the operating procedure for printing, first, characters or the like (text data) are entered via the keyboard 3 to create character string image data for printing.

Figure 7:
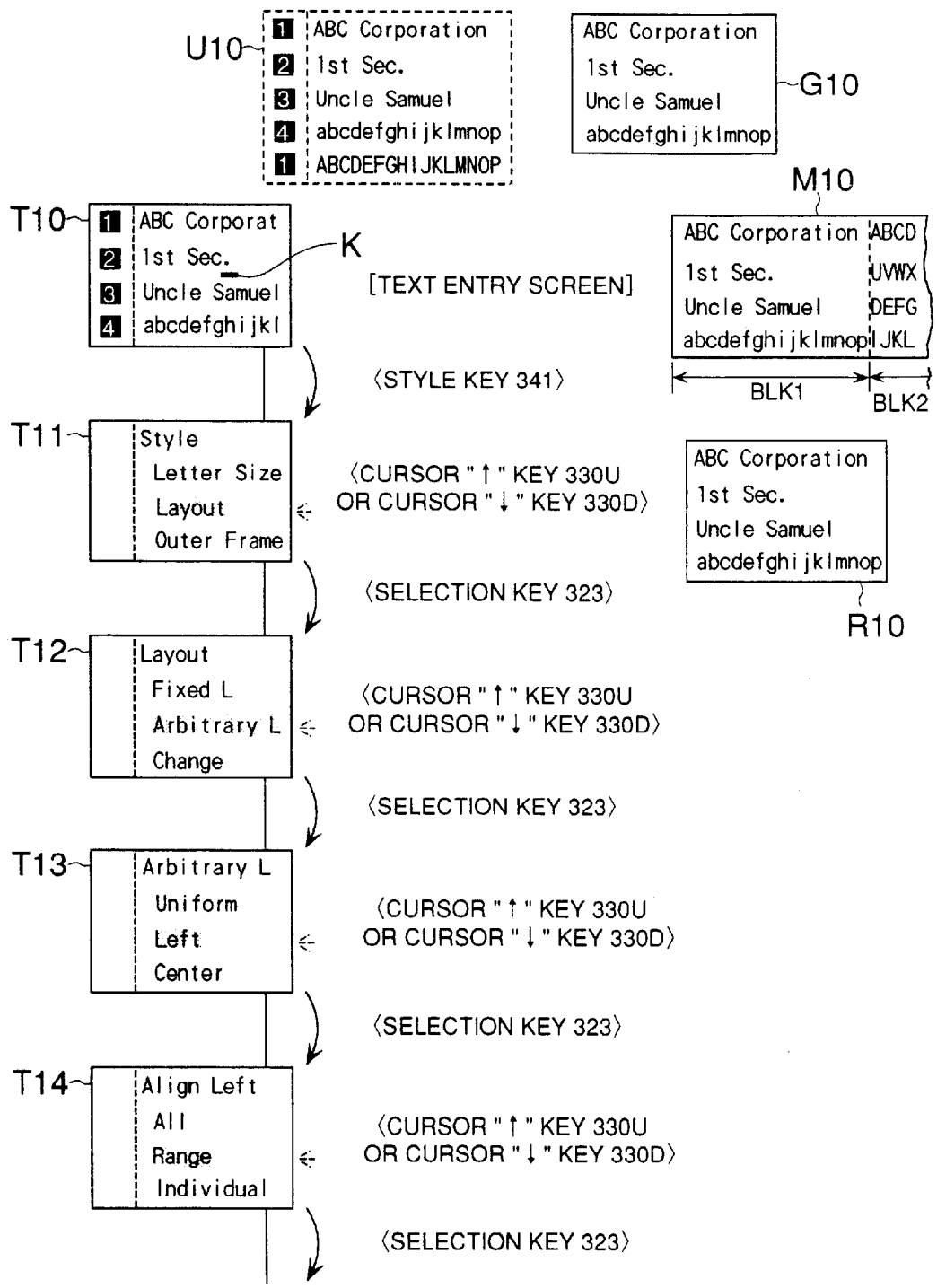
FIG. 7 is a diagram showing an example of a sequence of screens displayed during execution of the FIG. 6 character image layout process before a layout style-setting process is carried out at step S14 thereof and operations each carried out to display the following or preceding screen in the sequence.

For instance, as shown in FIG. 7, when text data U10 (the first five lines are shown in the figure) is formed in a manner such that a first text block BLK1 has text data "ABC Corporation" on a first line, text data "1st Sec." (First Section) on a second line, text data "Uncle Samuel" on a third line, and text data "abcdefghijklmnop" on a fourth line, and a second text block BLK2 has text data "ABCDEFGHIJKLMNOP" on a first line, text data "UVWX . . . " on a second line, text data "DEFG . . . " on a third line, and text data "IJKL . . . " on a fourth line, character string image data of the first text block BLK1 is created as image data G10. On the display screen 81 displaying the text entry screen, first four lines, for instance, are displayed, as shown in the figure (screen T10: hereinafter, contents displayed on the display screen 81 are referred to as "the screen T??" (? represents a digit) and the reference numerals for the screens are shown only by T??).

Now, the cursor K appearing in FIG. 7 shows a cursor position on the text entry screen. In the character image layout process described hereinafter, a text block where the cursor K is positioned is designated as a text block of which character images are to be laid out. That is, in the case of FIG. 7, the cursor K is positioned in the first text block BLK1 and hence the first text block BLK1 is a text block to be laid out.

In this state (T10), when the print key 322 is depressed to print the character string image data as it is, a print image is obtained as represented by a print image M10. If only a portion of the printing tape T1 having the first text block BLK1 printed thereon is cut off by operating the cut key 340, a label is obtained as represented by a label image R10 (hereinafter, a text data item is referred to as "U??", an image data item created from all or part of the text data item U?? is referred to as "G??", a print image formed by printing image data corresponding to the text data item "U??" and including the image data item including the portion G?? on the tape T is referred to as "M??", and a label image of a label created by cutting off the tape T is referred to as "R??". They are indicated in FIG. 7 et seq. by the same reference numerals).

In the following, by taking the above text data U10 as an example, a typical operating procedure will be described with reference to FIG. 6, in which the character image layout process characteristic of the invention is carried out to lay out character images. Key operations to be carried out by the user at respective steps of the operating procedures, processes for displaying images on the display screen 81 and other internal processes executed by the apparatus will be described with reference to FIG. 7 et. seq.

Figure 6:
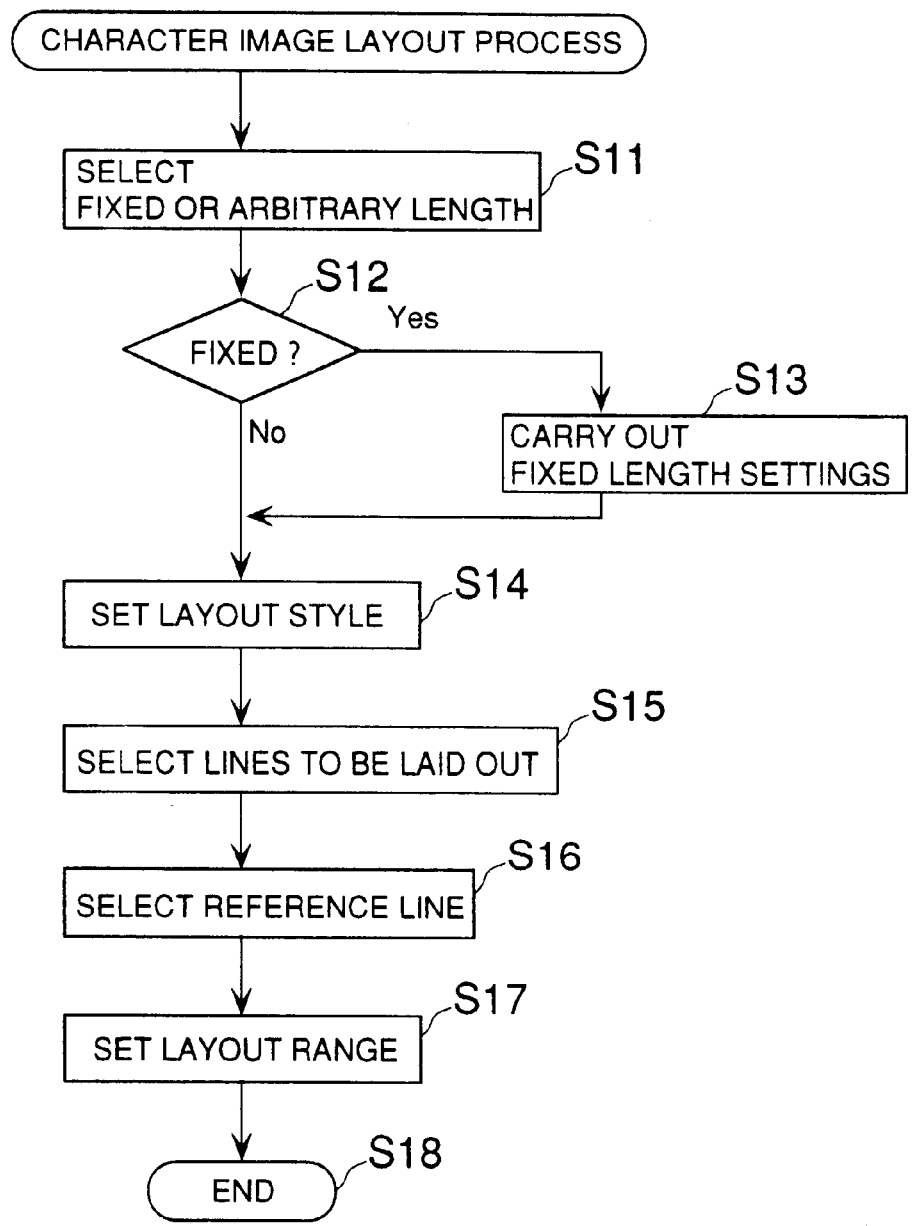
FIG. 6 is a flowchart showing a typical operating procedure for execution of a character image layout process.

Referring to FIG. 6, first, one of options "Fixed L" (fixed length) and "Arbitrary L" (arbitrary length) is selected for the character image layout process at step S11. For instance, when the style key 341 is depressed in the state described above with reference to FIG. 7 (T10), that is, in the state of the text entry screen, it becomes possible to select from the print format/style options of (1) "Letter Size" (Character size), (2) "Layout", (3) "Outer Frame". . . (T11). One of the above options can be selected by operating the cursor "↑" key 330U or the cursor "↓" key 330D to display the same in a decorated state (in the illustrated example, decoration is carried out by a method of shading character images by dots; hereinafter decorated displayed character images are referred to as character images "displayed in the shaded manner"), and then by depressing the selection key 323, it is possible to designate the option displayed in the shaded manner.

Immediately after depressing the style key 341, the default option of (1) "Letter Size" is displayed in the shaded manner and hence if the selection key 323 is depressed in this state, the option (1) "Letter Size" is selected to switch to a screen for carrying out a character size-changing process. In the illustrated example, the option (2) "Layout" is selected to display the same in the shaded manner (T11), to carry out the layout process, and by depressing the selection key 323, a selection screen (T12) is displayed, which prompts the user to select from the options of "Fixed L", "Arbitrary L" (Arbitrary Length) and "Change", for setting a layout style.

A fixed length layout process and a layout style changing process will be described later (see FIGS. 27 and 30). An arbitrary length layout process for laying out character string image data comprised of a plurality of lines having arbitrary or desired lengths will be described first in the following.

In the above-described selection (T12), after displaying the option "Arbitrary L" in the shaded manner, by depressing the selection key 323, a selection screen (T13) for selecting a layout style for the arbitrary length layout process is displayed. In other words, as shown in FIG. 6, when a fixed length/arbitrary length selection process is terminated at step S1, it is determined at step S12 whether or not the fixed length layout process is selected. If the fixed length layout is not selected (No to S12), the flow proceeds to a layout style-setting process (S14).

In the state of the selection screen (T13) being displayed, it is possible to select any of the options of (1) "Uniform" which designates uniform layout for arranging character images of each character string image at equal space intervals, (2) "Left" which designates left end alignment for aligning the left end of each character string image with the left end of a selected range, (3) "Right" which designates right end alignment for aligning the right end of each character string image with the right end of the selected range, (4) "Center" which designates center alignment for aligning the center of each character string image with the center of the selected range, and (5) "Scale Up/Dwn" which designates scale up/down processing for expanding or reducing the size of each character image such that the length of the character string image is adapted to the selected range.

In the illustrated example, after the option (2) "Left" is displayed in the shaded manner (T13), the selection key 323 is depressed to display a selection screen (T14) which prompts the user to select a method of designating lines to be laid out for the left end alignment process. In other words, in the FIG. 6 flowchart, when the layout style is set at step S14, the flow proceeds to a next process for selecting lines to be laid out (S15).

In the above-mentioned screen (T14), it is possible to select any of the options of (1) "All" for laying out all lines of a text block to be laid out, (2) "Range" for designating n consecutive lines ($2 \leq n \leq m$) out of m lines of character string image data ($m \geq 2$: m=4 in the FIG. 7 example of the cursor K being positioned in the first text block BLK1) by range selection, (3) "Individual" for designating lines to be laid out by marking n desired lines individually selected from the m lines of character string image data.

Figure 8:
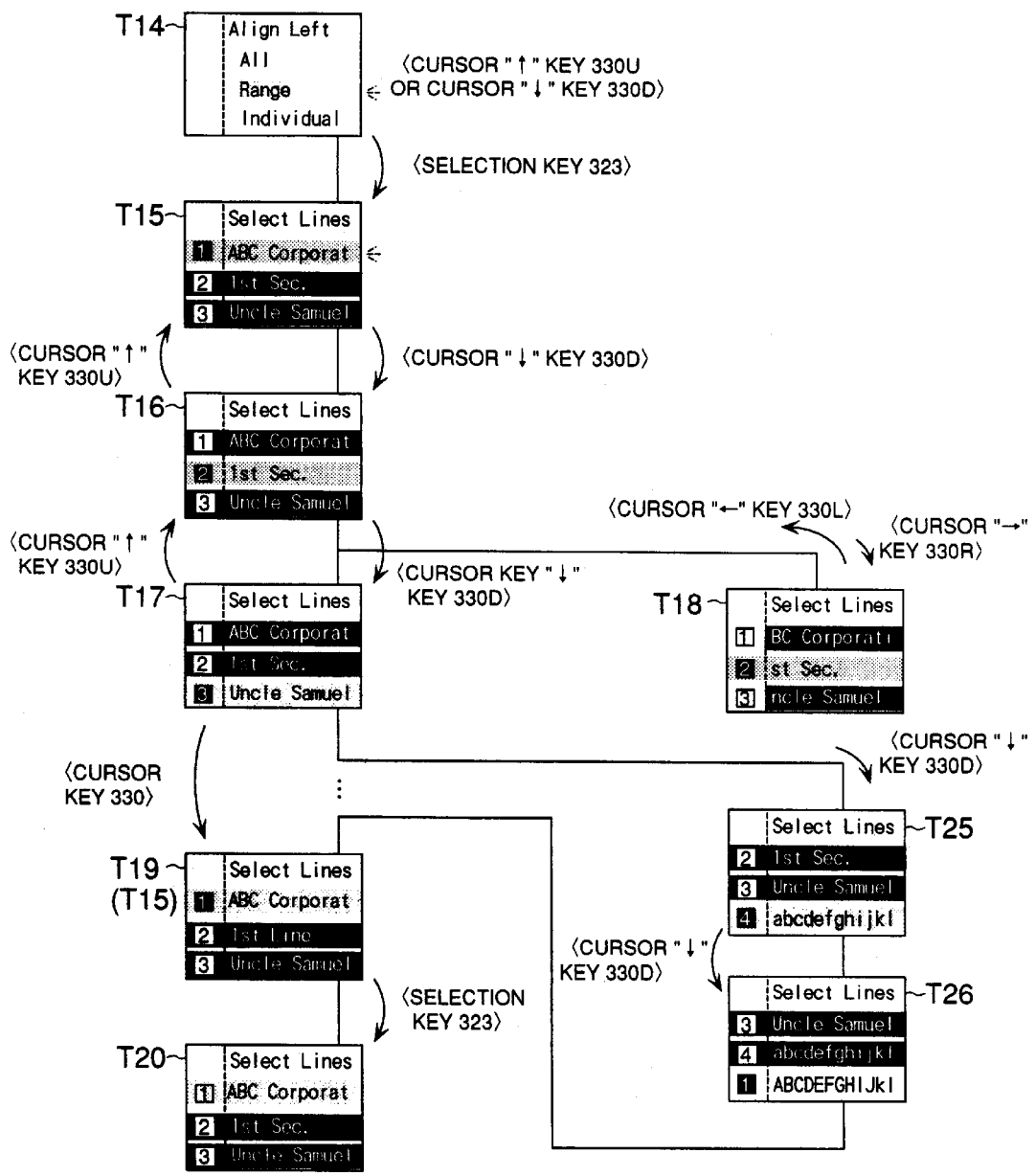
FIG. 8 is a diagram showing an example of a sequence of screens displayed during execution of lines to be laid out at step S15 in FIG. 6 and operations each carried out to display the following or preceding screen in the sequence.

In the illustrate example, after the option (2) "Range" is displayed in the shaded manner (T14: commonly shown in FIGS. 7 and 8), the selection key 323 is depressed to display a selection screen (T15) which prompts the user to select lines to be laid out (of the first text block BLK1 where the cursor K is placed), as shown in FIG. 8.

In the above state (T15), first, a starting line for the range selection is designated. Immediately after the selection screen (T15) is displayed for selection of lines to be selected, the text data "ABC Corporation" on the first line is displayed as a candidate for the starting line. In this process, the line number of the candidate line is displayed in reverse video and the whole of the same including the character string image ("ABC Corporation") is displayed in the shaded manner. Further, only the line number of each of the other lines in the same text block (the first text block BLK1) is displayed in normal video (black numeral in a white square) and all of the remaining portion is displayed in reverse video (T15).

When the cursor "↓" key 330D or the cursor "↑" key 330U is operated from the above state (T15), the candidate for the starting line can be changed (T16, T17 and T25).

It should be noted that to change the display range in the direction of the line head or in the direction of the line end, the cursor "←" key 330L or the cursor "→" key 330R is operated. Further, in the present case, the text block to be laid out is the first text block BLK1 having the cursor K positioned therein, as described above with reference to the screen T10 in FIG. 7, and hence, even when the cursor "↓" key 330D is operated from a state where the last line (fourth line) of the first text block BLK1 is selected as the candidate for the starting line (T25), the first line of the second text block BLK2 is only displayed (T26) without being selected as a candidate line.

Similarly, assuming that the second text block BLK2 is designated as a text block to be laid out, for instance, if the cursor "↑" key 330U is operated from the state of the first line of the second text block BLK2 being displayed, the last line (fourth line) of the first text block BLK1 is only displayed without being selected as a candidate line.

If the first line is selected as a candidate for the starting line (T19: identical to T15) by operating the cursor Key 330 as described above, and then the selection key 323 is depressed, the line is designated as the starting line for the range selection. Although the line number of a candidate for the starting line is displayed in reverse video, after the above operation, the line number of the designated starting line is displayed in the normal shaded manner as part of the line to be laid out, that is, similarly to the character string image ("ABC Corporation") of the remaining portion of the same (T20: commonly shown in FIGS. 8 and 9).

In this state where only the first line has been designated for the range selection (T20), that is, in the state where the first line has been specified as the starting line for the range selection, if the cursor "↓" key 330D or the cursor "↑" key 330U is operated to expand the selected range, the line number of each candidate line added to the selected range is displayed in reverse video and all of the remaining area of the same is displayed in the shaded manner (T21 and T22), similarly to a candidate for the starting line.

Now, if the second and third lines are additionally designated as the candidate lines by the range selection (T22) and then the selection key 323 is depressed, the determination of the lines to be laid out, by the range selection is effected, whereby the line numbers that were displayed in reverse video come to be displayed in the normal shaded manner (T23).

It should be noted that in the above process, the change in display in the direction of the line head or in the direction of the line end and a key operation from text block to text block (T25 to T26 in FIG. 8) are carried out similarly to the case described above with reference to FIG. 8 (T18, T26 and the like). Further, the selection or determination made by depressing the selection key 323 can be canceled by depressing the cancel key 326 to return to the immediately preceding screen (T24: identical to T22). The selection or determination made by operating the selection key 323 in FIGS. 7 and 8 can also be canceled by depressing the cancel key 326 to return to each immediately preceding screen. This is true in the following processes, and hence, in the following description, processes carried out through operating the cancel key 326 and the transition from screen to screen will be omitted.

Figure 9:
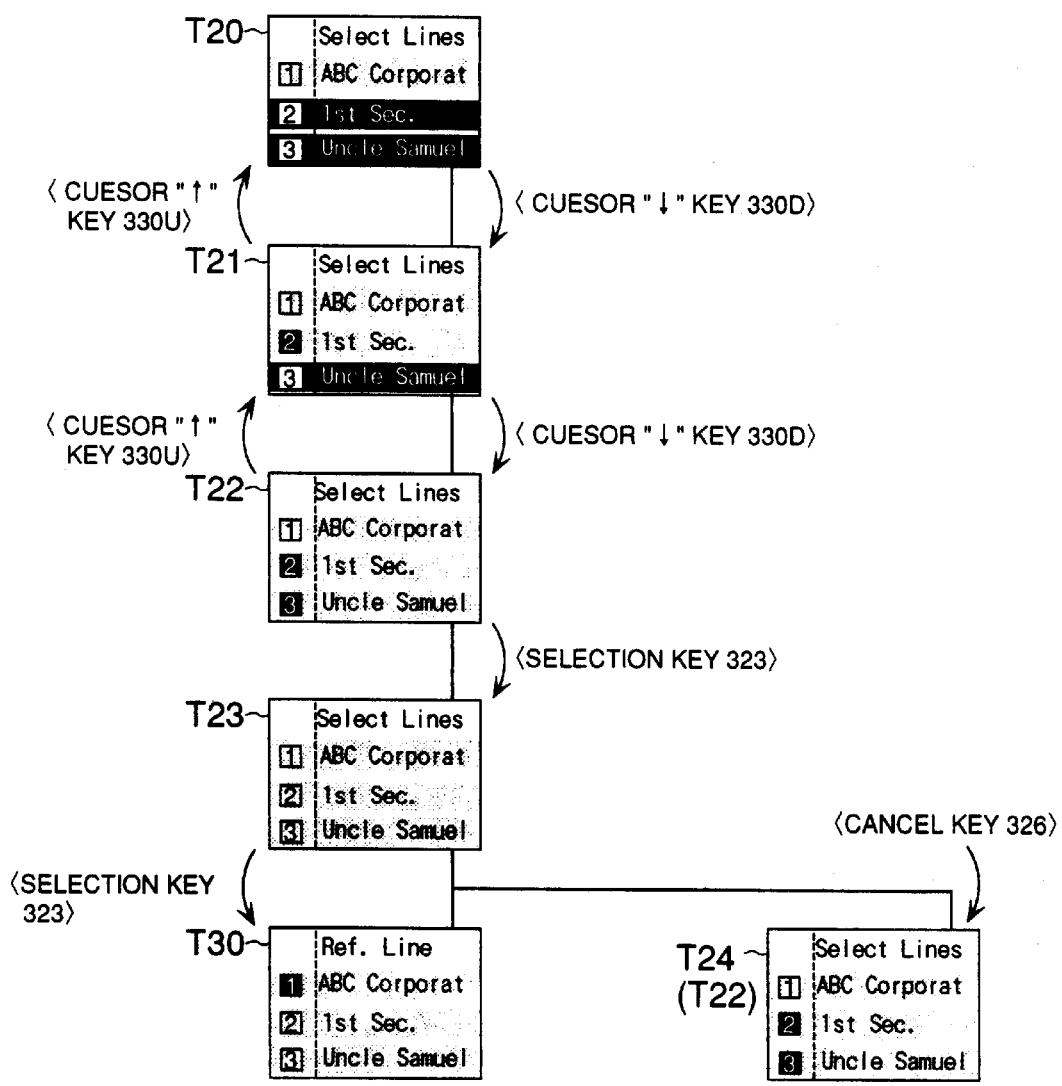
FIG. 9 is a continuation of the FIG. 8 diagram.
Figure 10:
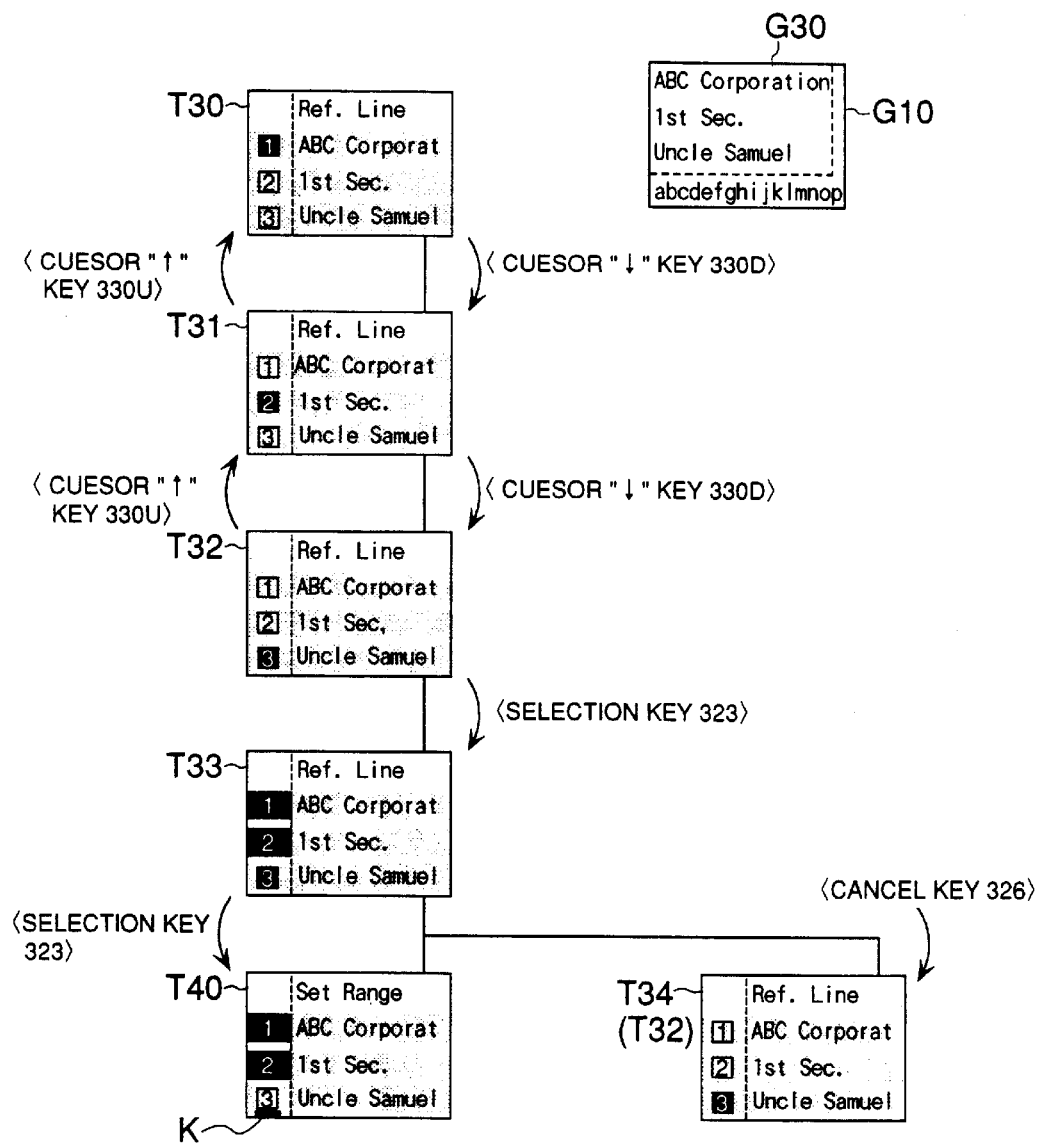
FIG. 10 is a diagram showing an example of a sequence of screens displayed during execution of a reference line-selecting process at step S16 in FIG. 6 and operations each carried out to display the following or preceding screen in the sequence.

After determining the lines to be laid out by the range selection and confirming the determined lines on the screen (T23), if the selection key 323 is depressed in this state (T23), a selection screen which prompts the user to select a reference line is displayed (T30: commonly shown in FIGS. 9 and 10). In other words, in the FIG. 6 flowchart, after selecting the lines to be laid out at step S15, the flow proceeds to a reference line-selecting process (S16).

The designated lines to be laid out correspond to image data G30 of the first to third lines of the first text block BLK1 represented by the character string image data G10.

Immediately after this selection screen (T30) is displayed, the first line of the selected range or the first line of the first text block BLK1 in the illustrated example is selectively displayed as a candidate for the reference line. Also in this process, the line number of the candidate line is displayed in reverse video and all of remaining portion of the same is displayed in the shaded manner (T30).

From this state (T30), the candidate for the reference line can be changed (T30 to T32) by operating the cursor "↓" key 330D or the cursor "↑" key 330U.

In the illustrated example, the third line (the character string image "Uncle Samuel") is selected as the candidate for the reference line (T22) and then the selection key 323 is depressed, whereby the third line is determined as the reference line and the whole line number boxes of the line in the selected range other than the reference one are displayed in reverse video (T33).

After determining the reference line and confirming the same on the screen T33, if the selection key 323 is depressed in this state (T33), a layout range-setting screen is displayed (T40: commonly shown in FIGS. 10 and 11). That is, in the FIG. 6 flowchart, after the reference line is selected at step S16, the flow proceeds to a layout range-setting process (S17).

On the layout range-setting screen, the line number of the reference line (the third line in the illustrated example) is displayed in normal video such that the reference line can be clearly distinguished from the other lines to be laid out (T40).

To set the full length of a character string image of the reference line to a layout range, the selection key 323 is depressed in the above state (T40, G40: identical to G30 in FIG. 10), whereby the full length of the character string image on the reference line (the third line of the first text block BLK1) is set to the layout range, and the FIG. 6 character image layout process is terminated at step S18, followed by returning to the text entry screen (T41). Resulting character string image data G41 of the selected lines and a print image M41 formed therefrom are shown in FIG. 11.

As described above, according to the tape printing apparatus 1, it is possible to designate n lines ($2 \leq n \leq m$: n=3 in the above example) out of m lines of character string images ($m \geq 2$: m=4 in the above example) as the lines to be laid out, select a desired line (the third line) from the n lines as a reference line, and set the range of the full length of a character string image on the reference line to a layout range, to thereby lay out each character string image on the other lines within the layout range.

That is, e.g. three lines (n=3: the first to third lines) out of four lines (m=4) of character string image data (identical to G10 in FIG. 10), as shown in FIG. 12A, are designated as lines to be laid out, and the full length of a character string image ("Uncle Samuel") on a reference line (the third line) is set to a layout range, to lay out character string images ("ABC Corporation" and "1st Sec.") on the other lines (the first and second lines) within the layout range, whereby character string image data, as shown in FIG. 12B, is produced.

Now, when the length of a character string image on any of the lines to be laid out is longer than the layout range, each character image on the line is reduced in size to lay out the resulting images within the layout range. For instance, in the above example shown in FIG. 12B, the character string image of "ABC Corporation" on the first line of the selected range is longer than the layout range (between one-dot-chain lines in the figure) (see FIG. 12A).

Therefore, the character string image of "ABC Corporation" is reduced or scaled down for layout within the layout range.

That is, a line of interest (third line) can be set to a reference line as desired, and at the same time, character images on a line longer than the reference line are reduced in size, whereby the character images (character images of "Uncle Samuel") on the reference line can be made more conspicuous than the character images (character images of "ABC Corporation") on the longer line. Further, the above processes can be executed simply by selecting a reference line, and hence it is possible to lay out character string images within a desired layout range through the simple operation.

Although in the above example, the three lines from the first line to the third line are designated as lines to be laid out, this is not limitative, but according to the tape printing apparatus 1, as described above with reference to FIG. 6 (S15) and FIGS. 8 to 9 (T14 to T30), each of n lines to be laid out can be selected from m lines (e.g. m=4) and hence it is also possible to specify two or four lines (n=2 or 4) as lines to be laid out.

More specifically, to set all the four lines in the first text block BLK1 to lines to be laid out in the above example, the option "All" is selected or displayed in the shaded manner on the selection screen (T14), described above with reference to FIG. 8, as the method selected for designating lines to be laid out and then the selection key 323 is depressed. This dispenses with the need to operations for selecting lines in the above process (T15 to T23 in FIGS. 8 to 9), and the selection screen for selecting a reference line (T30) is displayed immediately. That is, in the FIG. 6 flowchart, the process for selecting lines to be laid out (S15) is terminated and the flow proceeds to the reference line-selecting process (S16).

It should be noted that in this reference line-selecting process, the first to fourth lines of the character string image data G10 of the first text block BLK1 are the lines to be laid out. If the layout of images of the first to fourth lines is carried out in the same manner as described above, character string image data, as shown in FIG. 12C, can be obtained.

Of course, even when the option "Range" is selected on the selection screen (T14) as the method of designating lines to be laid out, as in the example described above, if the cursor "↓" key 330D for instance, is further depressed from the state of the screen T22 in FIG. 9 to set the first to fourth lines to the selected range, and then the selection key 323 is depressed, the four lines (all the lines of the character string image data) are designated as the lines, so that the same result can be obtained. In other words, it is also possible to create character string image data shown in FIG. 12C, by the range selection method described above.

Further, since lines to be laid out can be selectively designated, one or more lines which were not selected as the n lines can be preserved in the original state (in the original arrangement or layout) or arranged by another layout method. Further, after executing of the layout, some of the lines can be additionally laid out by still another layout method.

For instance, if the character string images on the first to fourth lines of the text block BLK1 are laid out as shown in FIG. 12C, and then the first to third lines thereof are additionally laid out within a layout range formed by part of the reference line, described hereinafter with reference to FIG. 13, etc., a layout shown in FIG. 14C can be created. That is, the capability of selective designation of lines to be laid out makes the character image layout method and device according to the invention applicable to a wider range of uses, to thereby increase the usefulness of the same.

Although in the above example, the option "Left" is selected to designate the left end alignment as a layout style, this is not limitative, but according to the tape printing apparatus 1, as described hereinabove with reference to FIG. 6 (S14) and FIG. 7 (T13), it is also possible to select any of the other options of "Uniform" for designating the uniform layout, "Right" for designating the right end alignment, "Center" for designating the center alignment, "Scale Up/Dwn" for designating the scale up/down processing such that the length of a character string image is made correspondent to a predetermined range, etc.

That is, the tape printing apparatus 1 is not only capable of reducing character images on a line (first line) longer than a layout range (the range of the length of the reference line (third line) in the above example) but also capable of selecting a layout style of a character string image on a line to be laid out (second line) having a length equal to or smaller than that of the layout range. Therefore, the apparatus is increased in usefulness and operability, which makes it easy to arrange (lay out) character string images as the user desires.

More specifically, in the above example in which all the four lines in the first text block BLK1 are designated as lines to be laid out, if the selection key 323 is depressed, e.g. after the option "Uniform" is displayed in the shaded manner from the state of the screen T13 in FIG. 7, i.e. after the option "Uniform" is selected, the character images can be laid out following the same procedure as described to produce character string image data as shown in FIG. 12D.

Similarly, if the option "Center" is selected from the state of the screen T13 in FIG. 7, character string image data shown in FIG. 12E can be created, whereas if the option "Right" is selected, character string image data shown in FIG. 12F can be created. Further, if the option "Up/Dwn" is selected, the character string image "1st Sec." on the second line is expanded in size in a manner dependent on the layout range. Also in the above cases, if only a line of interest is selected as a reference line, it is possible to carry out a line appearance modification process and an image size expansion process on character images on the other lines, which enables character images to be laid out through simple operations without designating a particular layout range therefor.

Although in the above example, the full length of the character string image on the reference line is set to a layout range, this is not limitative, but according to the tape printing apparatus 1, not the full length of a reference line but part of the same, that is, the length of part of the character string image on the reference line can be set to the layout range, whereby it is possible to lay out each character string image on the other lines within the thus defined layout range. In the following, examples of the above case will be described.

As described above with reference to FIG. 6, after selecting a reference line at step S16, the flow proceeds to the layout range-setting process (S17) in which the layout range-setting screen (T40: see FIGS. 10 to 11) is displayed.

Although in the example described hereinbefore with reference to FIG. 11, the selection key 323 is depressed in the above state (T40) to set the full length of the character string image on the reference line to a layout range, if the cursor "→" key 330R is depressed instead of the selection key 323, the cursor K having been positioned under the line number box is moved to an area of the character string image. Immediately after the movement, the cursor K is moved to a position which eventually sets the whole reference line (the third line) to the layout range, that is, a position of the last character on the reference line (the position of the second "1" of the character string image "Uncle Samuel") (T42).

When the cursor "→" key 330R or the cursor "←" key 330L is operated from the above state (T42), a range of the reference line displayed in the shaded manner, that is, the layout range, can be shifted (T42 to T44).

Figure 13:
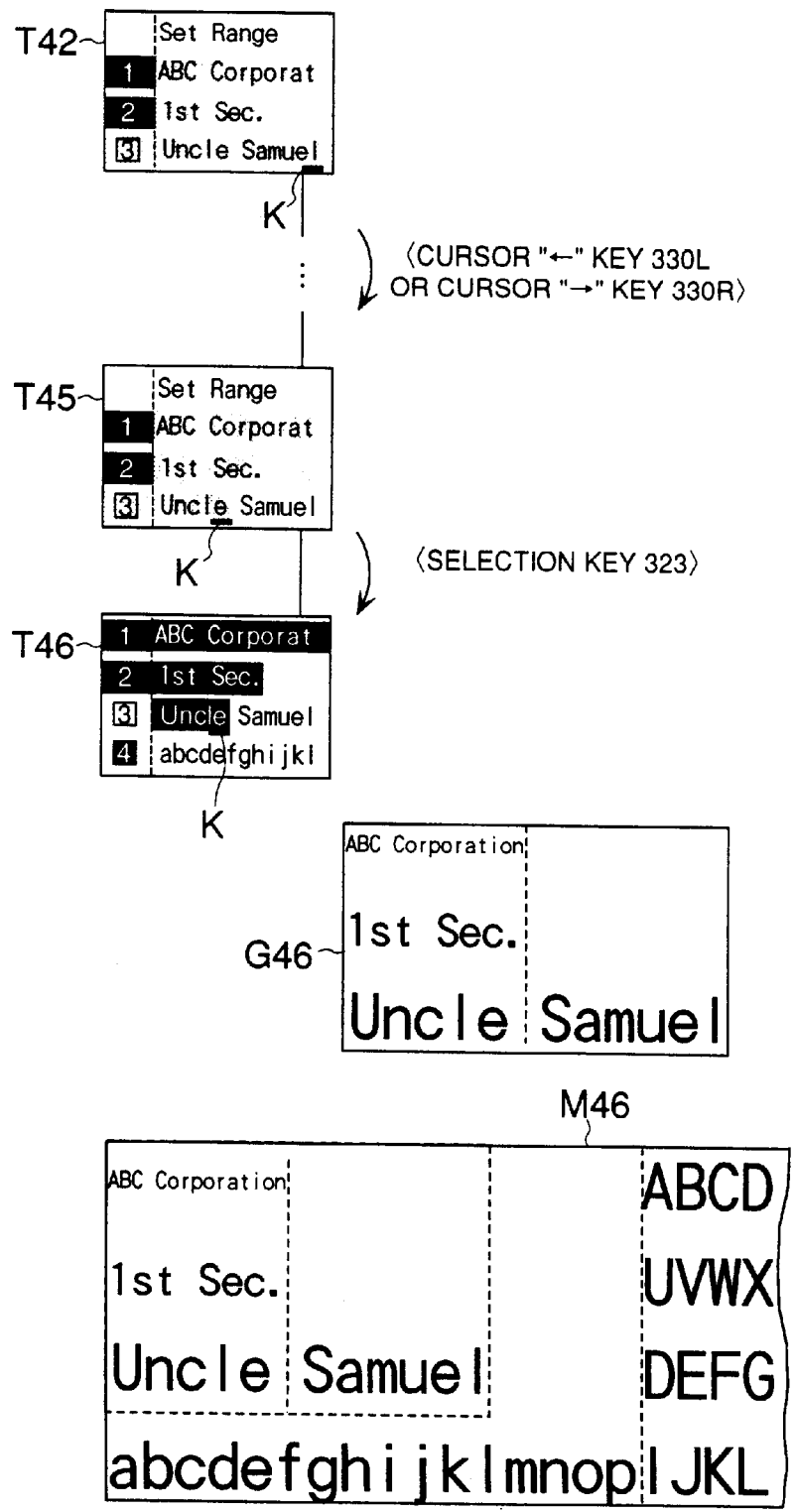
FIG. 13, which is a continuation of the FIG. 11 diagram, shows another example of a sequence of screens displayed during the layout range-setting process and operations each carried out to display the following or preceding screen in the sequence.

More specifically, if the cursor "→" key 330R or the cursor "←" key 330L is operated from the above state (T42: commonly shown in FIGS. 11 and 13) to position the cursor K under a fifth character image (the position of the first "e" of the character string image "Uncle Samuel") on the reference line (the third line) (T45), as shown in FIG. 13, and then the selection key 323 is depressed, the range or length from the first character image ("U") to the fifth character image ("e") on the reference line (the third line) is set to the layout range. Then, the FIG. 6 character image layout process is terminated at step S18, followed by returning to the text entry screen (T46).

However, in the above process, to distinctly display the lines to be laid out, the reference line, and the layout range, the line number of the reference line is displayed in normal video, and the background of character images within the layout range of the reference line is displayed in reverse video, whereas the whole line number box of each of the other lines to be laid out (the first and second lines of the same text block) is displayed in reverse video and the backgrounds of character images on these lines are also displayed in reverse video (T46). Image data G46 of the lines to be laid out and a print image M46 formed by printing the image data item including the image data 46 are shown in FIG. 13.

As described hereinabove, according to the tape printing apparatus 1, it is also possible to set not the full length of a reference line but part of the length of the character string image on the reference line to a layout range to thereby lay out each character string image on the other lines within the layout range.

For instance, by designating three lines (n=3: the first to third lines) out of four lines (m=4) of character string image data (identical to G10 in FIG. 10), as shown in FIG. 14A (identical to FIG. 12A), as lines to be laid out, and setting the range or a length from a first to a fifth character image (from "U" to the first "e" of the character string image "Uncle Samuel") i.e. the range of "Uncle" on the reference line (the third line) to a layout range, character string image data in which character string images ("ABC Corporation", "1st Sec.") on the other lines (the first to second lines) are laid out within the layout range, as shown in FIG. 14B, is produced.

Therefore, according to the tape printing apparatus 1, it is possible to make a line of interest (reference line) more conspicuous by designating not the whole reference line but part thereof as a layout range within which the other lines should be laid out, and lay out or arrange character string images in various manners, without spoiling the simplicity of the layout operation.

It should be noted that if the apparatus is configured such that this method and the method of setting the whole reference line to a layout range can be employed in combination, the apparatus further enables the user to lay out a desired one(s) other than the reference line (other line) in a layout range defined by the whole reference line (hereinafter referred to as "the full layout range"), as well as lay out the other desired line(s) in a layout range defined by part of the reference line (hereinafter referred to as "the partial layout range"). This layout operation will be described hereinafter in further detail with reference to FIG. 19 et. seq.

Further, if a character image layout, such as one shown in FIG. 12C, is produced in the immediately preceding layout process and then the first to third lines of the character string image data are laid out within a layout range having a length equal to that of part of the reference line (the third line), it is possible to obtain a character image layout, such as one shown in FIG. 14C, as referred to hereinbefore.

Although in the above example, the first to third lines are designated by the range selection as lines to be laid out, this is not limitative, but according to the tape printing apparatus 1, it is possible to individually select desired lines as lines to be laid out, even if they are not consecutive lines. In the following, this individual line-selecting method will be described.

Figure 15:
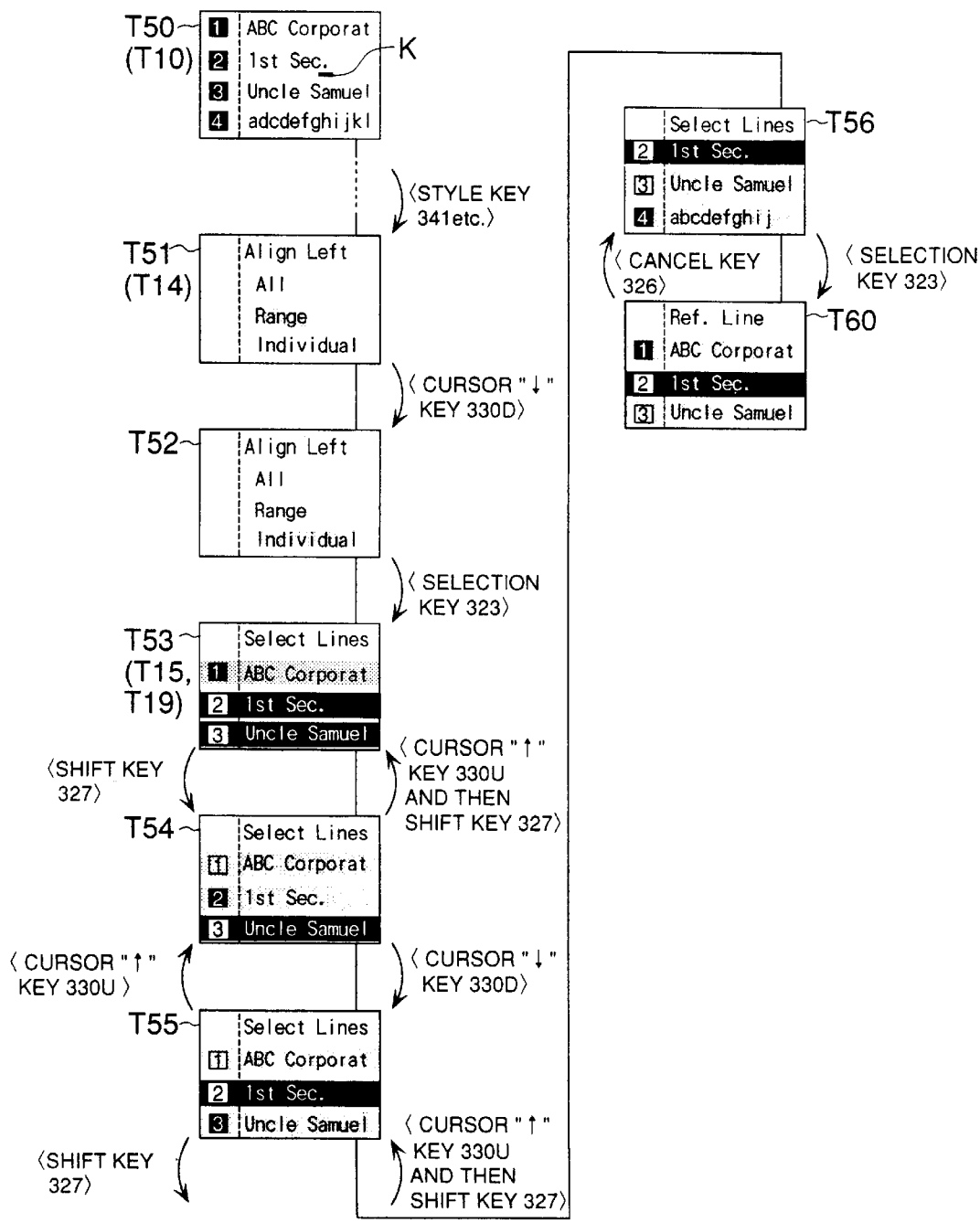
FIG. 15 is a diagram showing another example of a sequence of screens displayed during the process corresponding to those in FIGS. 7 to 9.

When inconsecutive lines are to be designated as lines to be laid out, as desired, first, e.g. as shown in FIG. 15, the style key 341, etc. are operated in the same manner as described above, from a screen (T50) identical to the text entry screen T10 described above with reference to FIG. 7, whereby the selection screen is displayed which prompts the user to select a method of designating lines to be laid out during setting of the left end alignment for a layout range under the arbitrary length layout, described hereinbefore with reference to FIG. 8 (T51: identical to T14 in FIG. 8).

If the cursor "↓" key 330D is further depressed from the above state (T51) to display an option "Individual" in the shaded manner (T52) and then the selection key 323 is depressed, the selection screen for selecting lines to be laid out, similarly to the case of the option "Range" being selected, is displayed (T53: identical to T15 and T19 in FIG. 8).

When the option "Individual" is selected, it is possible to directly or individually select lines to be laid out by operating the shift key 327 on the selection screen for designation of the lines to be laid out. First, immediately after the selection screen is displayed, the first line of a text block to be laid out (the first line of the first text block BLK1 in this example) is displayed as a candidate for a line to be laid out. The line number of the candidate line is displayed in reverse video and the whole remaining portion is displayed in the shaded manner (T53), similarly to the case of designating a candidate for a line to be laid out by range selection, so that when the shift key 327 is depressed in this state (T53), the first line is designated for selection to have the line number thereof displayed in the normal shaded manner, and a next line (the second line of the text block BLK1) is displayed as a candidate for a line to be laid out (T54).

When the cursor "↑" key 330U is depressed from the above state (T54), there is displayed a state in which only the first line is selected as the line to be laid out without any line being displayed as a candidate line, that is, a state where only the first line on the screen T53 is replaced by the first line on the screen T54, and further if the shift key 327 is depressed in this state, the state is caused to return to the immediately preceding one (T53). In other words, by operating the shift key 327 on a line once selected as a line to be laid out, it is possible to cancel the setting of the line as the line to be laid out.

On the other hand, when the cursor "↓" key 330D is depressed from the state where the second line is displayed as a candidate line (T54), a next line (the third line of the text block BLK1) is displayed as a candidate line by skipping over the second line as a candidate line (T55). Of course, it is also possible to display the second line as a candidate line again by depressing the cursor "↑" key 330U.

Similarly, when the shift key 327 is depressed in the state where the third line is displayed as a candidate line (T55), the third line is selected as a line to be laid out so that the line number thereof is displayed in the normal shaded manner and a next line (the fourth line of BLK1) is displayed as a candidate line (T56). As described above, the setting of the third line can be cancelled by displaying the same as a candidate line again by depressing the cursor "↑" key 330U and then depressing the shift key 327.

Figure 16:
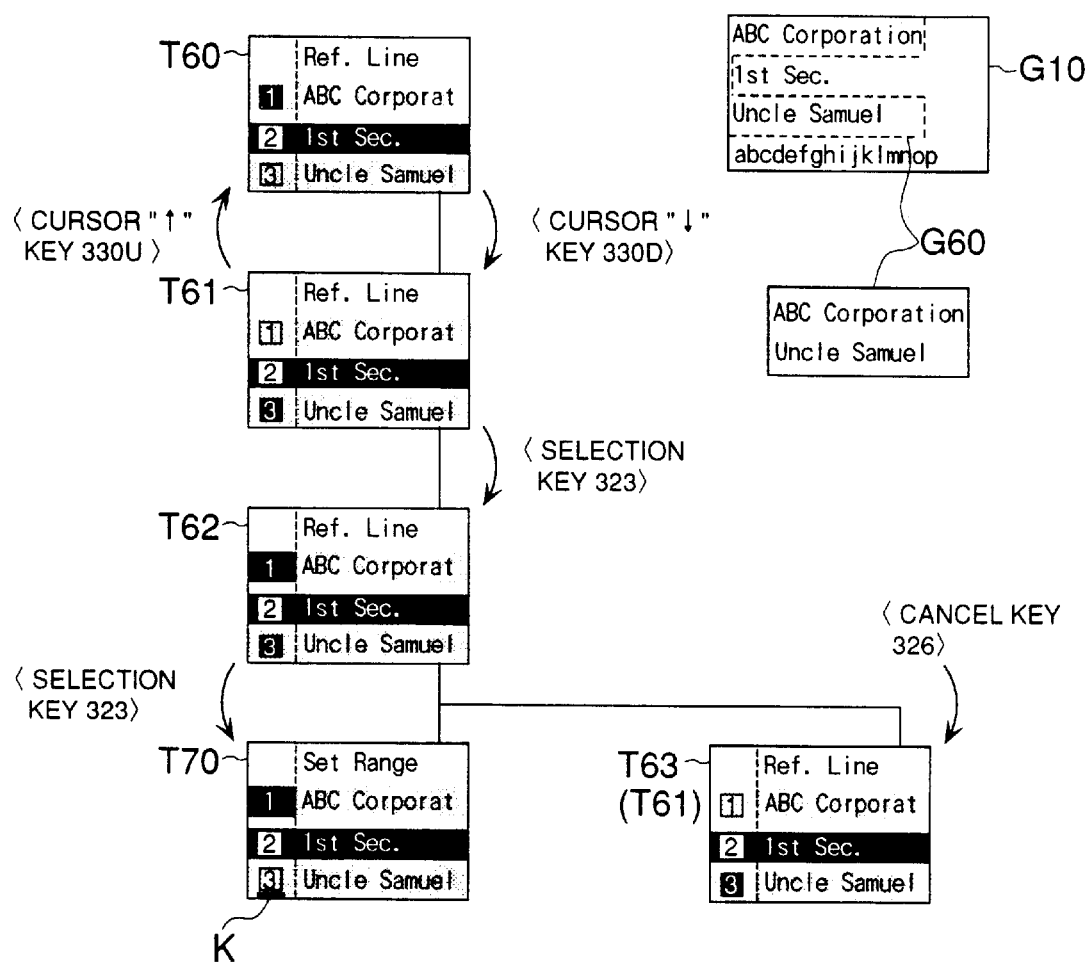
FIG. 16, which is a continuation of the FIG. 15 diagram, shows another example of a sequence of screens displayed during the reference line-selecting process.

After the user thus selects desired lines (the first and third lines of the text block BLK1 in the above example) as lines to be laid out and confirms them on the screen, if he depresses the selection key 323, a selection screen is displayed which prompts the user to select a reference line (T60: commonly shown in FIGS. 15 and 16). That is, in the FIG. 6 flowchart, the process for setting lines to be laid out (S15) is terminated and the flow proceeds to the next process for selecting a reference line (S16). The lines to be laid out designated in this example are the first and third lines (n=2) of the four lines (m=4) of the character string image data G10 in the first text block BLK1 (see G60 in FIG. 16).

Referring to FIG. 16, immediately after the selection screen for selecting the reference line (T60) is displayed, the first line (the first line of the text block BLK1 in the above example) of the lines to be laid out is displayed as a candidate for the reference line, with the line number thereof displayed in reverse video and the whole remaining portion displayed in the shaded manner (T60).

Although the candidate for the reference line can be changed by operating the cursor "↓" key 330D or the cursor "↑" key 330U from the above state (T60), differently from the example described above with reference to FIG. 10, the second line is not a line to be laid out and can not be a candidate for the reference line, so that the second line is skipped when the cursor is operated (T60 to T61).

Figure 17:
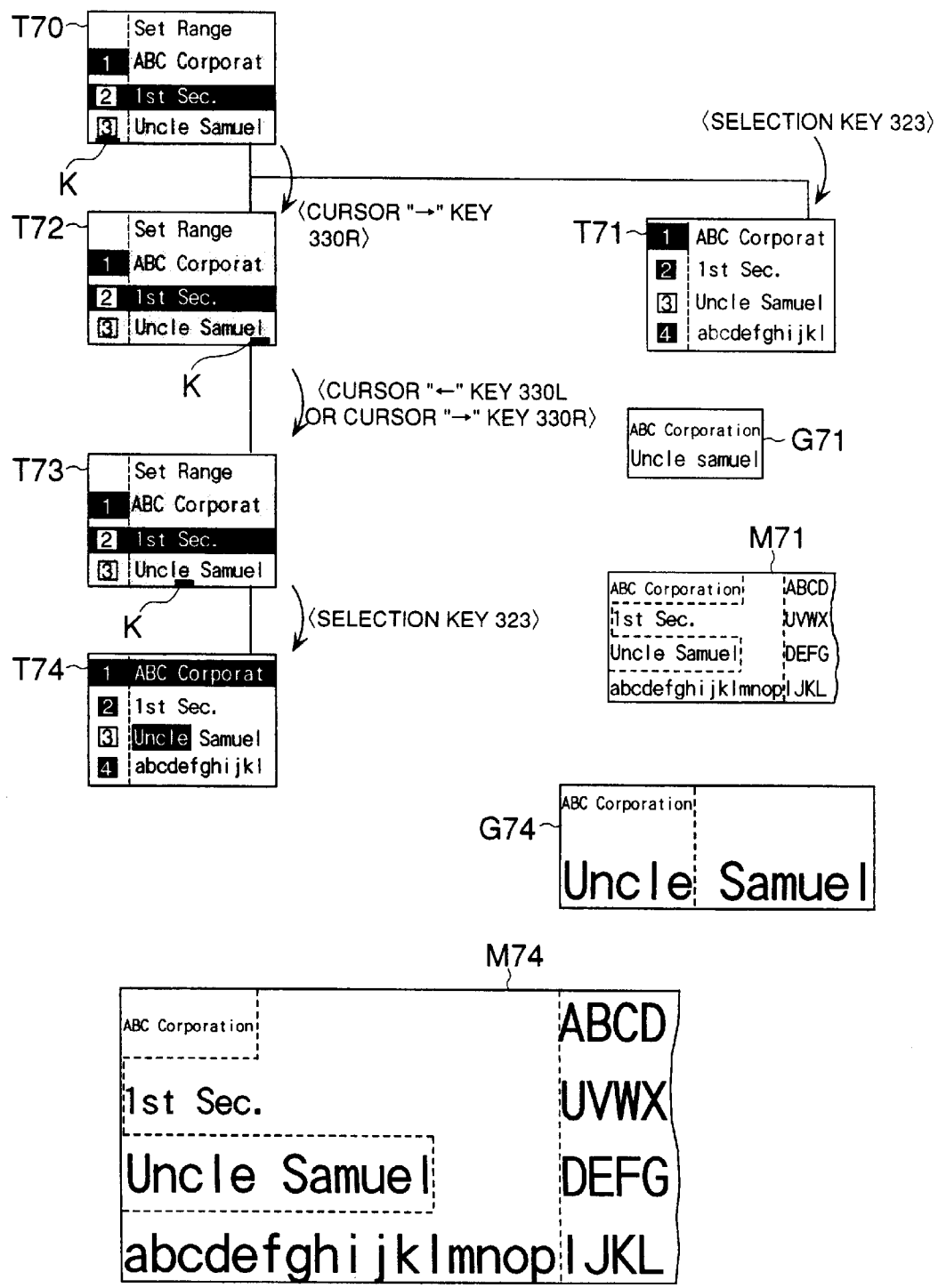
FIG. 17, which is a continuation of the FIG. 16 diagram similar to FIGS. 11 and 13, shows another example of a sequence of screens displayed during the layout range-setting process.

In the illustrated example, the third line (the character string image "Uncle Samuel") is selected as a candidate for the reference line (T61) and then the selection key 323 is depressed, whereby the third line is designated as the reference line and a whole line number box of a line (the first line) other than the reference line out of the lines to be laid out (the first and third lines) is displayed in reverse video (T62), so that when the selection key 323 is depressed after confirming on the screen that the whole line number box is displayed in reverse video, a layout range-setting screen is displayed in which the line number of the reference line (the third line) is displayed in normal video (T70: commonly shown in FIGS. 16 and 17). That is, in the FIG. 6 flowchart, the reference line-selecting process at step S16 is terminated, and the flow proceeds to the process for setting a layout range at step S17.

Referring next to FIG. 17, if the full length of a character string image on the reference line is desired to be set to the layout range, similarly to the example described above with reference to FIG. 11, by depressing the selection key 323 in the above state (T70), the full length of the character string image on the reference line (the third line of the first text block BLK1) is set to the layout range, whereby the FIG. 6 character image layout process is terminated at step S18, followed by returning to the text entry screen (T71). Character image data G71 of the lines to be laid out and a print image M71 formed using the same are shown in FIG. 17.

That is, for instance, two lines (n=2: the first and third lines of the text block BLK1) out of four lines (m=4) of character string image data (identical to G10 in FIG. 16), as shown in FIG. 18A (identical to FIG. 12A), are selected as lines to be laid out, and the range of the length of a character string image ("Uncle Samuel") on the reference line (the third line of BLK1) is set to a layout range (full layout range). Thereafter, a character string image ("ABC Corporation") on the other line (the first line) is laid out within the layout range to form character string image data as shown in FIG. 18B.

On the other hand, when the cursor "→" key 330R is depressed instead of the selection key 323 in the above state (T70), the cursor K having been positioned under the line number box of the reference line is moved to the area of the character string image so as to set not the full length of the reference line but the range of a length of part of the character string image on the reference line to the layout range (partial layout range). Immediately after the operation, the cursor K is moved to a position where the whole reference line (the third line) is eventually set to the layout range, that is, the position of the last character on the reference line (the position of the second "l" of the character string image "Uncle Samuel") (T72).

If the cursor "→" key 330R or the cursor "←" key 330L is operated from the above state (T72) and the selection key 323 is depressed e.g. in the state of the cursor K being positioned under the fifth character image (the position of the first "e" of the character string image "Uncle Samuel") on the reference line (the third line) (T73), similarly to the example described hereinbefore with reference to FIG. 13, the range of a length from the first character image ("U") to the fifth character image ("e") on the reference line (the third line) is set to the partial layout range. Then, the FIG. 6 character image layout process is terminated at step S18, followed by returning to the text entry screen (T74). A character image data G74 of the lines to be laid out and a print image M74 formed using the same are shown in FIG. 17.

That is, for instance, the two lines (n=2: the first and third lines of BLK1) shown in FIG. 18A, are selected as lines to be laid out, and the fifth character image ("e") on the reference line (the third line of BLK1) is set to a limit defining the partial layout range. Then, the character string image ("ABC Corporation") on the other line (the first line) is laid out within the layout range to form the character string image data shown in FIG. 18B.

As described above, according to the tape printing apparatus 1, desired n lines ($2 \leq n \leq m$) out of m lines ($m \geq 2$: m=4 in the above example) of character string image data are marked as lines to be laid out (by a manner of display of their line numbers in the example described above), whereby regardless of whether or not the n lines to be laid out are consecutive ones (see T41 in FIG. 11 and T46 in FIG. 13 as examples of consecutive lines to be laid out and T71, T74 in FIG. 17 as examples of inconsecutive lines to be laid out), it is possible to easily discriminate each line to be laid out on the display screen and select n lines to be laid out through simple operations, which improves usefulness and operability of the apparatus.

Further, the tape printing apparatus 1 is capable of setting the full length of a character string image on a reference line to a layout range (full layout range) or setting not the whole reference line but the range of a length of part of the character string image on the reference line to the same (partial layout range), to thereby lay out each character string image on each line other than the reference ones such that the character string images are accurately received within the respective layout ranges. Therefore, it is possible to make a line of interest (reference line) conspicuous and lay out character string images in various manners, without spoiling the simplicity of the layout operation (see FIGS. 12, 14 and 18).

Although in the above example, only one of the full layout range and the partial layout range is employed as a layout range, this is not limitative, but according to the tape printing apparatus 1, both of the layout ranges can be employed at the same time. In the following, a layout process using the two ranges will be described.

As described hereinabove, after the reference line is selected at step S16 and the flow proceeds to the layout range-setting process (S17) in which the layout range-setting screen (T40 in FIG. 11, and T70 in FIG. 17) is displayed, if the cursor "→" key 330R is depressed in this state, the cursor K having been positioned under the line number box of the reference line is moved to the area of the character string image so as to set not the whole reference line but the range of a length of part of the character string image on the reference line to a layout range (partial layout range). Immediately after the operation, the cursor K is moved to a position where the whole reference line (the third line) is eventually set to the layout range, that is, the position of the last character on the reference line (for instance, the position of the second "1" of the character string image "Uncle Samuel") (T42 in FIG. 13, T72 in FIG. 17).

In the following, description is made by using the example (designating the first to third lines as the lines to be laid out) described above with reference to FIG. 13, which is easier to understand.

Referring to FIG. 19, when the shift key 327 is depressed in the state of a screen T80 (identical to T42 in FIG. 13) instead of the cursor "←" key 330L and the cursor "→" key 330R described above, first, a layout range (full layout range) wherein the full length of a reference line (the third line) is set to the layout range is determined to provisionally set lines (first and second lines) to be laid out within the full layout range.

Thereafter, even if the cursor K is moved (e.g. to the position of the first character image "U" of the character string image "Uncle Samuel"), the shaded range does not change differently from e.g. the screen T45 in FIG. 13 (T81).

Therefore if the selection key 323 is depressed in the above state (T81), the same character string image data G41 and print image M41 obtained above (see FIG. 12B) can be obtained, followed by the screen switching to a screen identical to the text entry screen T41 described above with reference to FIG. 11 (T82).

On the other hand, if the shift key 327 is depressed from the above state (T81), a partial layout range-designating process is started for designating the partial layout range through operation of the cursor K, and the position of the cursor K (in the illustrated example at the first character image "U" of the character string image "Uncle Samuel") becomes a candidate for a starting position (hereinafter referred to as "the candidate starting position") from which the partial layout range starts to be designated. The candidate starting position is displayed in reverse video (T83: commonly shown in FIGS. 19 and 20).

Figure 20:
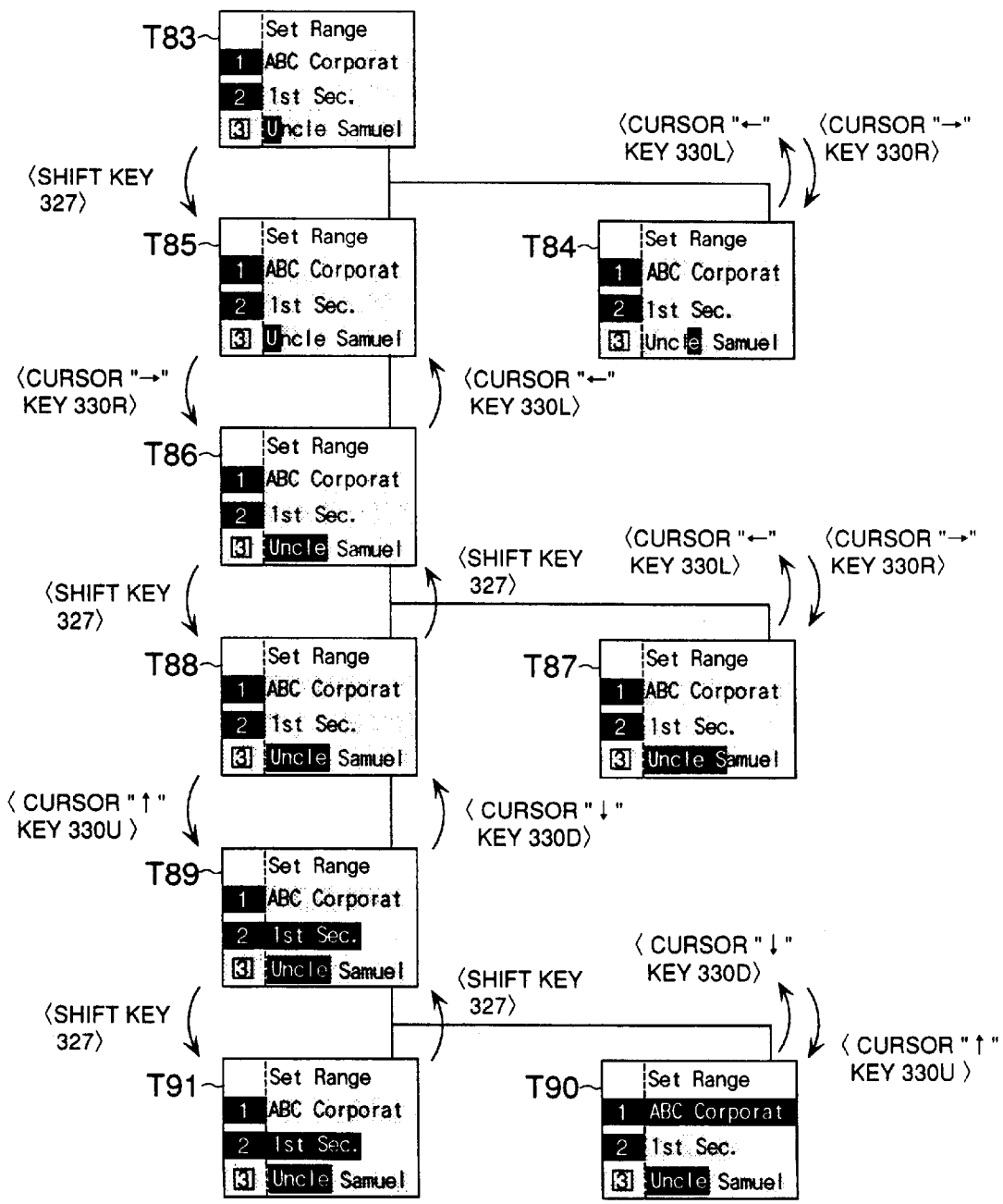
FIG. 20, which is a continuation of the FIG. 19 diagram, shows another example of a sequence of screens displayed during the layout range-setting process.

Referring next to FIG. 20, if the cursor "←" key 330L or the cursor "→" key 330R is operated from the above state (T83), the candidate starting position can be changed (T83 to T84).

In the present case, the description will be made in accordance with the examples described above with reference to FIGS. 13 to 14, in which the third line of the first text block BLK1 is selected as the reference line for determining the partial layout range and a range of the first to fifth character images (the character images "Uncle" of the character string image "Uncle Samuel") on the third line is set to the partial layout range within which character images should be laid out.

The above-mentioned state (T83) is a state where the cursor K is positioned at the first character image "U" on the third line to indicate a candidate starting position (T83). First, when the shift key 327 is depressed in this state, the position of the cursor K is set to the starting position of the partial layout range (T85). Then, as the cursor "←" key 330L or the cursor "→" key 330R is operated, a range displayed in reverse video, that is, the partial layout range can be changed (T85 to T87).

In the illustrated example, the shift key 327 is depressed in a state where the range of the first to fifth character images ("Uncle") is designated as a candidate for the partial layout range (being displayed in reverse video)(T86), so that the range of "Uncle" is set to the partial layout range (T88). That is, even if the cursor "←" key 330L or the cursor "→" key 330R is operated from this state (T88), the partial layout range does not change. Further, if the shift key 327 is depressed again from the state (T88), the determination of the range as the partial layout range is canceled (the display screen returns to the state of the screen T86).

When the cursor "↑" key 330U or the cursor "↓" key 330D is operated from the above state (T88), candidates for lines to be laid out in the partial layout range are displayed in reverse video (T88 to T90: T89 to T90 are commonly shown in FIGS. 20 and 21).

Figure 21:
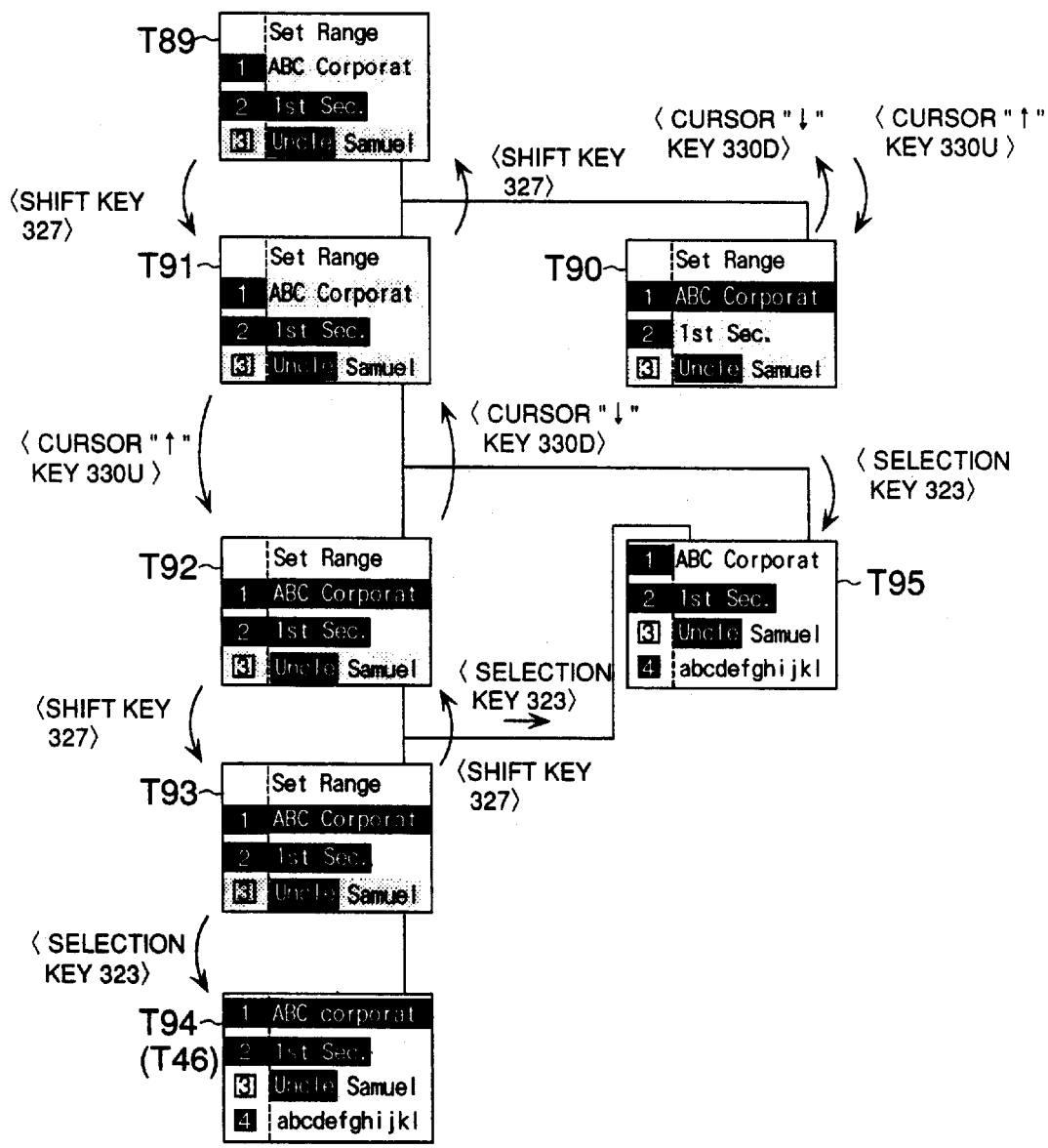
FIG. 21, which is a continuation of the FIG. 20 diagram, shows another example of a sequence of screens displayed during the layout range-setting process.

Now, when the shift key 327 is depressed in a state where the second line is selected as a candidate line, the second line is determined as a line to be laid out in the partial layout range (T91: commonly shown in FIGS. 20 and 21). Also in this case, if the shift key 327 is depressed again, the setting of the second line to the line to be laid out is canceled (the display screen returns to the state of the screen T89).

Referring next to FIG. 21, when the cursor "↑" key 330U is operated from the above state (T91), the first line is further displayed in reverse video as a candidate for a line to be laid out in the partial layout range (T92).

When the shift key 327 is depressed in the state of the first line being selected as a candidate for a line to be laid out, similarly to the second line, the first line is determined as a line to be laid out in the partial layout range (T93). This determination can be canceled similarly to the case of the second line.

When the selection key 323 is depressed in the above state (T93), the range of the first to fifth character images ("Uncle") on the reference line (the third line) is finally determined as the partial layout range and the lines (first and second lines) to be laid out in the partial layout range are also finally determined. Then, the FIG. 6 character image layout process is terminated at step S18, followed by returning to the text entry screen (T94).

However, the result of the above process eventually becomes the same as the example described above with reference to FIG. 13 (T94: identical to T46 in FIG. 13), so that the resulting character string image data and the print image formed using the same are identical with the character string image data G46 and the print image M46 described hereinabove with reference to FIG. 13. In the four lines (m=4) of character string image data in FIG. 14A, the range of the first to fifth character images ("Uncle") on the reference line(the third line) is determined as the partial layout range, and character string image data shown in FIG. 14B is formed.

On the other hand, when the selection key 323 is depressed in a state where the second line is determined as a line to be laid out in the partial layout range (T91), or in a state in which although the first line is further selected as a candidate line, the same is not yet determined as a line to be laid out (T92), the range of the first to fifth character images ("Uncle") on the reference line (the third line) is determined as the partial layout range and the lines (first and second lines) to be laid out within the partial layout range are finally determined. Then, the FIG. 6 character image layout operation is terminated at step S18, followed by returning to the text entry screen (T95).

In the above process, out of four lines (m=4) of character string image data in FIG. 22A (identical to FIGS. 12A, 14A and 18A), three lines (n=3: the first to third lines) are set to lines to be laid out, similarly to the case of FIG. 12B, and the whole reference line (third line) is set to the full layout range (see FIG. 22B), while the range of the first to fifth character images (the range of "Uncle") on the reference line (the third line) is set to the partial layout range (see FIG. 22C) and the second line is set as the line to be laid out in the partial layout range, so that character string image data shown in FIG. 22D is created.

Figure 23:
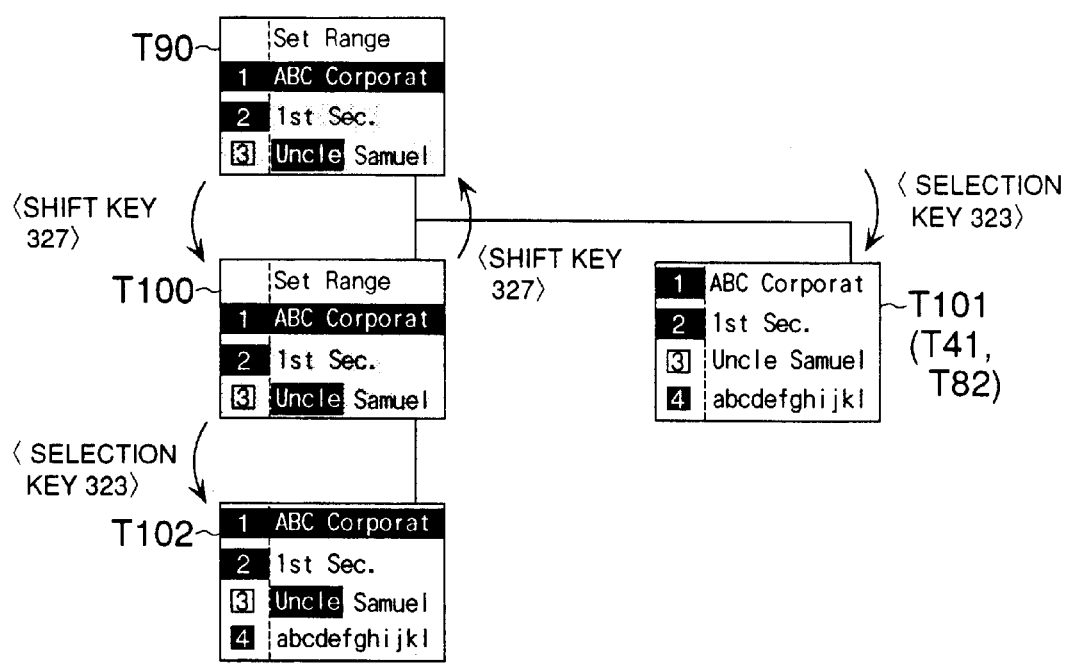
FIG. 23 is a diagram similar to FIG. 21, which shows still another example of a sequence of screens displayed during the layout range-setting process.

Further, it is possible to set only the first line to the line to be laid out within the partial layout range. In this case, as shown in FIG. 23, when the shift key 327 is depressed in the state of the first line being selected as a candidate for a line to be laid out, described above with reference to FIG. 20 or 21 (T90: commonly shown in FIGS. 20 and 21), the first line is determined as the line to be laid out within the partial layout range (T100). Also in this case, if the shift key 327 is depressed again, the determination of the first line as the line to be laid out is canceled (the display screen returns to the state of the screen T90).

It should be noted that when the selection key 323 is depressed instead of the shift key 327 in the above state (T90), although the partial layout range is finally determined (T88 in FIG. 20), no lines to be laid out within this range are determined, and hence the same result is obtained as obtained in a case where the partial layout range is not set (T101: identical to T41 in FIG. 11 and T82 in FIG. 19).

Further, in the state where the first line is determined as a line to be laid out within the partial layout range (T100), by operating the cursor "↓" key 330D, the second line can be selected as a candidate for a line to be laid out within the partial layout range. However, if the second line is added to the line to be laid out, similarly to the example shown in FIG. 21 (T94), the result becomes the same as the example described above with reference to FIG. 13 (T46).

On the other hand, when the selection key 323 is depressed in the above state (T100), the range of the first to fifth character images ("Uncle") on the reference line (the third line) is determined as the partial layout range and the line (first line) to be laid out in the partial layout range is finally determined. Then, the FIG. 6 character image layout operation is terminated at step S18, followed by returning to the text entry screen (T95).

In the above process, out of four lines (m=4) of character string image data in FIG. 24A (identical to FIG. 12A), three lines (n=3: the first to third lines) are set to lines to be laid out, similarly to the case of FIG. 12B, and the whole reference line (third line) is set to the full layout range, while the range of the first to fifth character images (the range of "Uncle") on the reference line (the third line) is set to the partial layout range and the first line is designated as the line to be laid out within the partial layout range, so that character string image data shown in FIG. 24B is formed.

As described above, according to the tape printing apparatus 1, it is possible to employ both the method of designating the whole of a reference line as a layout range and the method of designating not the whole of the reference line but part thereof as a layout range in combination, so that a desired one(s) of the lines other than the reference line can be laid out within a layout range defined by the whole reference line (the full layout range), whereas the other desired line (s) can be laid out within a layout range defined by part of the reference line (the partial layout range).

Further, although in the above example, a reference line the full length of which is the full layout range and a reference line part of which is the partial layout range are set to the same line (the third line), this is not limitative, but these reference lines can be set to different lines. In the following example, a layout process for setting one of the reference lines to a line other than the third line will be described.

Figure 25:
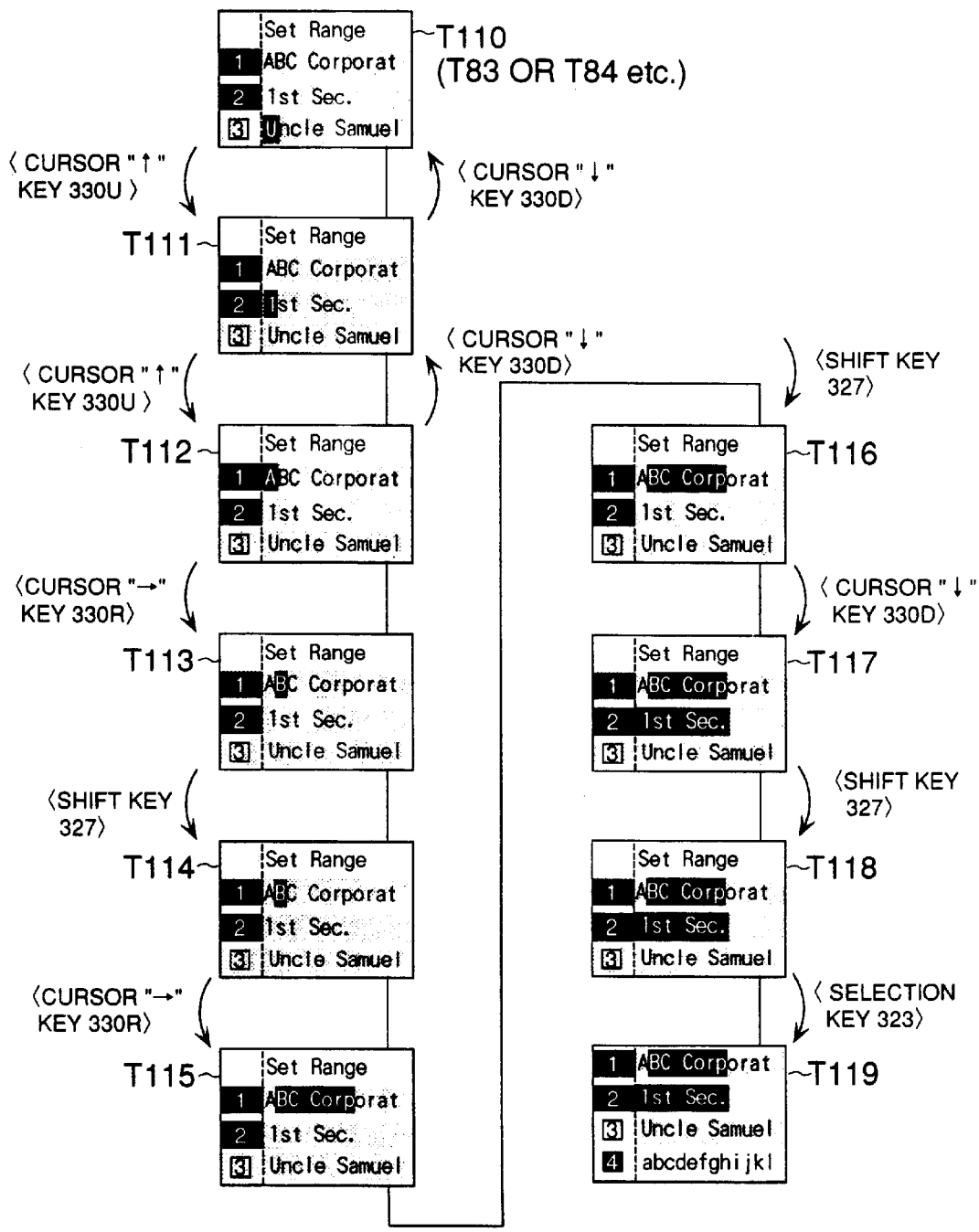
FIG. 25 is a diagram similar to FIG. 21, which shows still another example of a sequence of screens displayed during the layout range-setting process.

Referring now to FIG. 25, the screen T100 (identical to T83 in FIG. 20) shows a state in which the partial layout range-designating process is carried out to set the position of the cursor K (the position of the first character image "U" of the character string image "Uncle Samuel" in the illustrated example) to a candidate starting position for the starting position of the partial layout range by displaying the character image in reverse video. In the FIG. 20 example (T83 to T84), the cursor "←" key 330L or the cursor "→" key 330R is operated to change the candidate starting position (T110 to T112), but the same end can be attained by operating the cursor "↑" key 330U or cursor "↓" key 330D.

That is, the partial layout range can be set or defined by using a length of part of a line other than the reference line for determining the full layout range, and hence the tape printing apparatus 1 is configured such that the candidate starting position can be moved to another line.

When the cursor "→" key 330R is depressed from a state where the position of a first character on the first line (the position of the character image "A" of the character string image "ABC Corporation") is designated as the candidate starting position (T112), the second character ("B") on the first line is selected as the candidate starting position (T113). Of course, even if the cursor "→" key 330R is first operated to designate the position of the second character on the third line (the position of the character image "n" of the character string image "Uncle Samuel") as the candidate starting position (T84 in FIG. 20) and then the cursor "↑" key 330U is twice depressed, the same state (T113) can be obtained.

When the shift key 327 is depressed in the above state (T113), the second character ("B") on the first line is determined as the starting position of the partial layout range (T114). Thereafter, as the cursor "←" key 330L or the cursor "→" key 330R is operated the range displayed in reverse video, that is, the partial layout range is changed (T114 to T115).

In the illustrated example, the shift key 327 is depressed in a state where the range of the second to eighth character images ("BC Corp") (a space is counted as one character image) on the first line is designated as a candidate for the partial layout range (T115), whereby the range of "BC Corp" is determined as the partial layout range (T116). That is, even if the cursor "←" key 330L or the cursor "→" key 330R is operated from this state (T116), the partial layout range no longer changes. Further, when the shift key 327 is depressed again from the state (T116), the determination of the partial layout range is canceled (the display screen returns to the state of the screen T115).

When the cursor "←" key 330D is depressed in the above state (T116), the second line is displayed in reverse video as a candidate for a line to be laid out within the partial layout range. Then, when the shift key 327 is depressed, the line (the second line) is determined as a line to be laid out within the partial layout range (T118). Also in this process, the determination can be canceled by depressing the shift key 327 (the display screen returns to the state of the screen T89).

When the selection key 323 is depressed in the above state (T118), the first line is determined as the reference line, whereupon the range of the second to eighth character images ("BC Corp") on the reference line (the first line) is finally determined as the partial layout range, and the second line as the line to be laid out in the partial layout range. Then, the FIG. 6 character image layout process is terminated at step S18, followed by returning to the text entry screen (T95).

In the above process, out of four lines (m=4) of character string image data identical to those shown in FIG. 12A, three lines (n=3: the first to third lines) are set to lines to be laid out and the third line is set the reference line, similarly to the case of FIG. 12B. Further, the full length of the reference line (third line) is set to the full layout range, while the first line is set to the reference line in which the partial layout range is defined by the range of the second to fifth character images ("BC Corp") thereof, with the second line being designated as the line to be laid out within the partial layout range. The resulting character string image data is shown in FIG. 26A.

Further, if the option "Uniform" is selected similarly to the case of FIG. 12D, that the whole of the third line is set to the full layout range similarly to the case of FIG. 25, that the range of the first to third character images (the character images "1st" of the character string image "1st Sec." on the second line is set to the partial layout range, and that the first line is designated as a line to be laid out within the partial layout range, character string image data shown in FIG. 26B can be formed.

Similarly, assuming that the option "Center" is selected in advance, that the whole of the third line is set to the full layout range, that the a range of the whole of the second line is set to the partial layout range, and that the first line is designated as a line to be laid out within the partial layout range, character string image data shown in FIG. 26C can be formed.

Of course, by selecting the option "Uniform", using the third line as the reference line for determining both the full layout range and the partial layout range, as described above with reference to FIGS. 14 and 18, setting the range of the third to ninth character images (the character images "cle Sam" of the character string image "Uncle Samuel") on the third line to the partial layout range, and designating the first line as a line to be laid out within the partial layout range, character string image data shown in FIG. 26D can be created.

As described above, according to the tape printing apparatus 1, it is possible not only to employ both the method of laying out lines within a full layout range and the method of laying out lines within a partial layout range in combination, but also to set reference lines for determining the layout ranges on respective different lines. This makes it possible to design a variety of layouts, which improves usefulness and operability of the apparatus.

Although in the above example, the arbitrary length layout was selected as a layout style in the fixed length/arbitrary length selection process (S11) (see T12 in FIG. 12) and hence description has been made of the arbitrary length layout process, this is not limitative, but according to the tape printing apparatus 1, the option "Fixed L" can be selected. In the following, the fixed length layout process will be described.

As described hereinbefore with reference to FIG. 7, immediately after depressing the style key 341, the default option (1) "Letter Size" is displayed in the shaded manner. If the option "Layout" is selected to be displayed in the shaded manner instead of the option (1) "Letter Size" (T11) and then the selection key 323 is depressed, the selection screen is displayed, which prompts the user to select from the options "Fixed L", "Arbitrary L" (Arbitrary Length) and "Change" for the layout process (T12).

Figure 27:
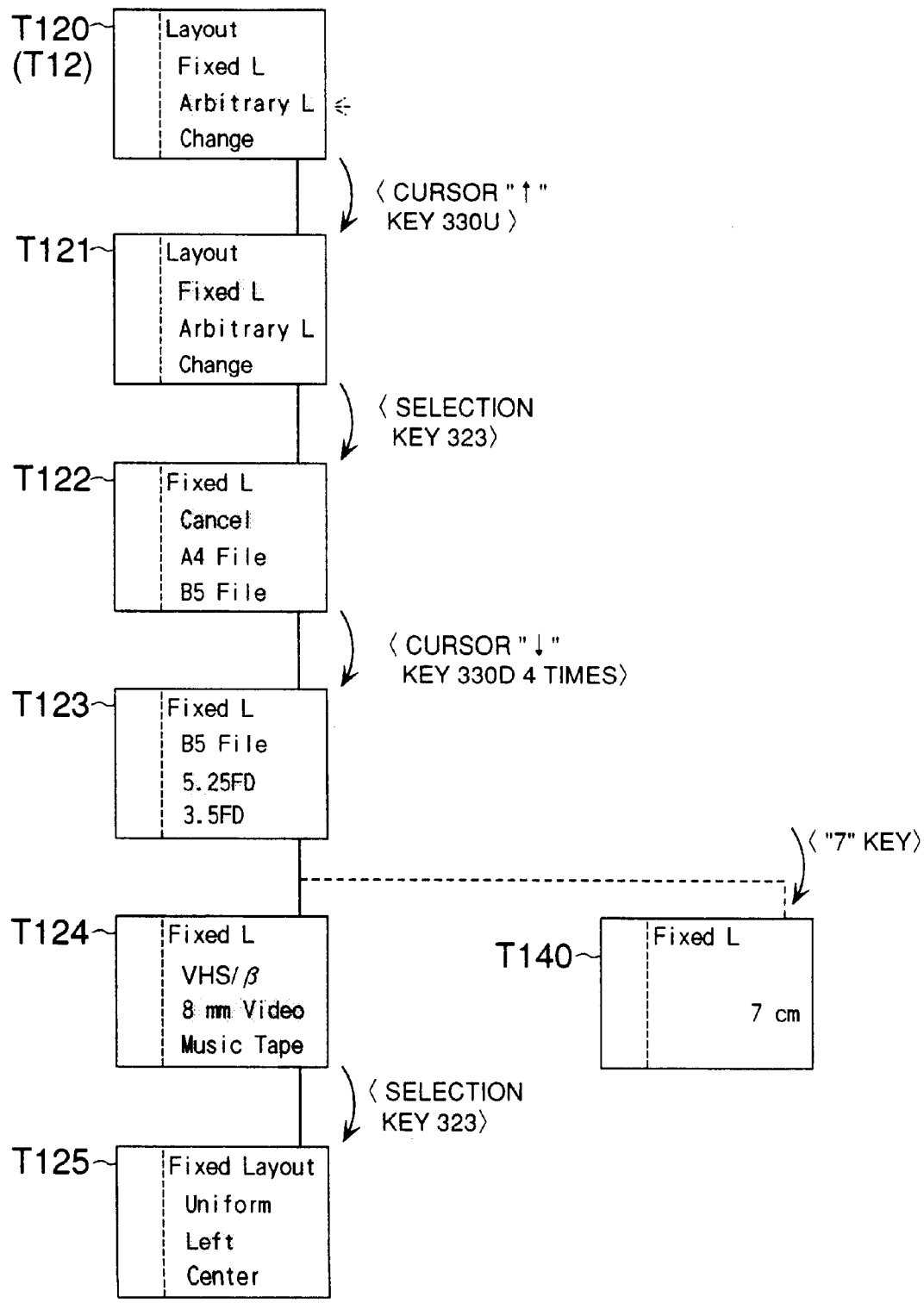
FIG. 27 is a diagram showing an example of a sequence of screens displayed during execution of the layout style-setting process at step S14 in FIG. 6 and operations each carried out on to display the following or preceding screen in the sequence.

Referring now to FIG. 27, if the cursor "↑" key 330U is operated from the above state (T120: identical to T12 in FIG. 7) to display the option "Fixed L" in the shaded manner (T121) and the selection key 323 is depressed, differently from the above case where the option "Arbitrary L" (Arbitrary Length) is selected, a selection screen for setting the fixed length is displayed (T122). That is, in the FIG. 6 flowchart, after the fixed length/arbitrary length selection process is terminated at step S11, it is determined at step S12 whether or not the fixed length layout is selected. If the fixed length layout is selected (Yes to S12), then, the flow proceeds to a fixed length-setting process (S13).

From the selection screen for setting the fixed length (T122), it is possible to select any of options of (1) "Cancel" for canceling execution of the setting of a fixed length, (2) "A4 File" for designating the width of a label for use in an A4 file, as a length defining the fixed format (in the present embodiment, this label is assumed to have a width of 20 cm), (3) "B5 File" for similarly designating the width of a label for use in a B5 file (15 cm), (4) "5.25 FD" for designating the width of a label for use in a 5.25 floppy disk (8.5 cm), (5) "3.5 FD" for designating the width of a label for use in a 3.5 floppy disk (6.5 cm), (6) "VHS/β" for designating the width of a label for use in a VHS/β video tape cassette (14 cm), (7) "8 mm Video" for designating the width of a label for use in an 8 mm video tape cassette (7 cm), (8) "Music Tape" for designating the width of a label for use in a music tape (9.5 cm), etc. (T122 to T124).

In the illustrated example, the option "8 mm Video" is displayed in the shaded manner (T124) and the selection key 323 is depressed to display a selection screen which prompts the user to select a layout style (fixed length layout) (T125). That is, in the FIG. 6 flowchart, after terminating the fixed length-setting process, the flow proceeds to the layout style-setting process (S14).

It should be noted that the tape printing apparatus 1 is capable of not only selecting a length adapted to a fixed format, as described above, but also setting an arbitrary length e.g. "7 cm" to the fixed length by operating a desired number key of the number key group 313 (for instance, "7" key) (T140).

The layout style-setting process and processes subsequent thereto are carried out similarly to the case of the above arbitrary length layout process, and therefore detailed description thereof will be omitted. In the tape printing apparatus 1, if the fixed length is set (S13 in FIG. 6), when the FIG. 6 character image layout operation is terminated at step S18, to create character string image data, first, each character image on the reference line is laid out such that the length of a character string image on the reference line becomes equal to the fixed length.

In other words, if the scale up/down processing is set as a layout style of the reference line, first, the reference line is increased or decreased in size (scaled up or down) to lay out the same to the length set therefor.

Figure 28A:
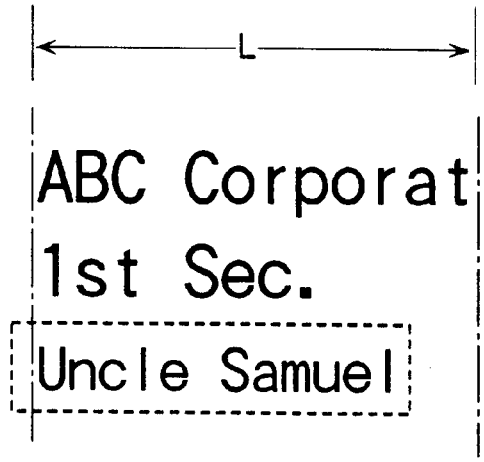
FIGS. 28A to 28C are diagrams similar to FIGS. 12A to 12F, which show other examples of images of respective character string image data items formed by the FIG. 27 layout style-setting process.
Figure 28B:
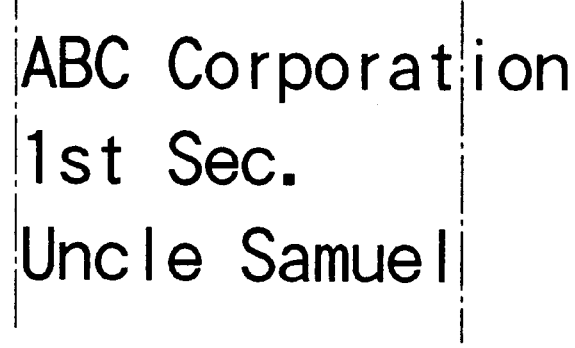
Figure 28C:
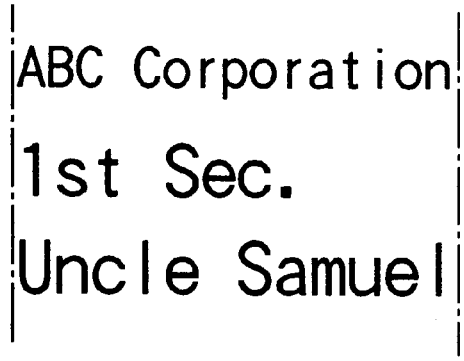

For instance, assuming that the option "Left" is selected as a layout style of the other lines than the reference line, similarly to the example described above with reference to FIG. 7 (T13), the third line ("Uncle Samuel") of the character string image data in the example described above with reference to FIG. 12A etc., (see FIG. 28A), which is the reference line, is first expanded (scaled up) to the range of the preset length L (L=7 cm in the above example) (see FIG. 28B) and then, in the same manner as carried out in the arbitrary length layout process, the other lines are laid out to a layout range set based on the reference line (the full layout range in the case of FIGS. 28A to 28C)(see FIG. 28C).

Figure 29A:
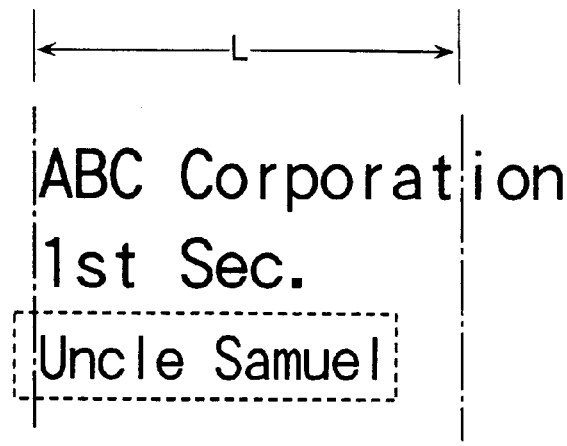
FIGS. 29A to 29C are diagrams similar to FIGS. 12A to 12F, which show still other examples of images of respective character string image data items created by the FIG. 27 layout style-setting process.
Figure 29B:
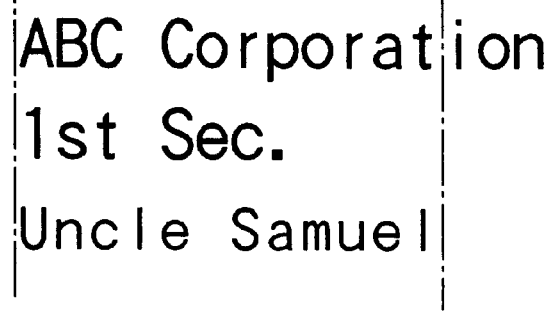
Figure 29C:
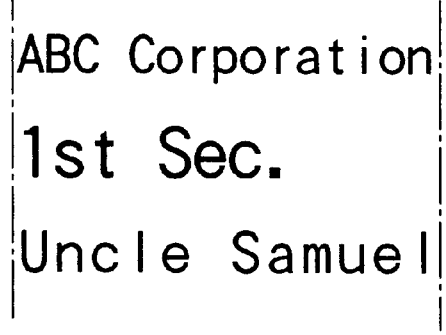

It should be noted that in addition to the above scale up/down processing, it is possible to set the uniform layout as a layout style of the reference line. In this case, character string image data is formed as shown in FIGS. 29A to 29C which correspond to FIGS. 28A to 28C. By configuring the apparatus such that the above layout styles can be selectively set, the usefulness and operability thereof is further improved.

As described above, according to the tape printing apparatus 1, if the fixed length is selected as the length of a layout range, each character image on the reference line is laid out such that the length of the character string image on the reference line becomes equal to the length of the range of the fixed length. As a result, it is possible not only to make a line of interest conspicuous as a reference line but also to set the length of the line of interest.

The above fixed length layout process is distinguished from the arbitrary length layout process only in that a reference line for defining the full layout range is set to a preset length (the preset length L shown in FIGS. 29 and 30) and hence the layout methods described above in the example of the arbitrary length layout process can also be employed in the fixed length layout process. That is, by changing the layout style variously (S14 in FIG. 6) or employing the full layout range and the partial layout range in combination, various layouts can be provided.

Although in the above examples, character images are laid out according to the typical operating procedure shown in FIG. 6, the user may wish to carry out only part of the operating procedure, e.g. when the user may wish to very slightly modify the layout of an existing character string image data item (e.g. to change only the preset length of a reference line), or when the user may wish to modify only part of character string image data once formed (laid out) (e.g. to change only the selected reference line or only the layout style of lines other than the reference line).

To cope with such cases, according to the tape printing apparatus 1, only part of the operating procedure can be carried out. That is, in these cases, it is also possible to select the option "Change" instead of the options of "Fixed L" and "Arbitrary L" (Arbitrary length) in the fixed length/arbitrary length selection process (step S11) described above with reference to FIG. 6. In the following, a case of the option "Change" being selected will be described.

As described hereinbefore with reference to FIG. 7, immediately after depressing the style key 341, the default option of (1) "Letter Size" is displayed in the shaded manner. By selecting the option (2) "Layout" to display the same in the shaded manner instead of the option (1) "Letter Size" (T11) and depressing the selection key 323, the selection screen is displayed which prompts the user to select from the options of "Fixed L", "Arbitrary L" (Arbitrary Length) and "Change" for the layout process (T12).

Figure 30:
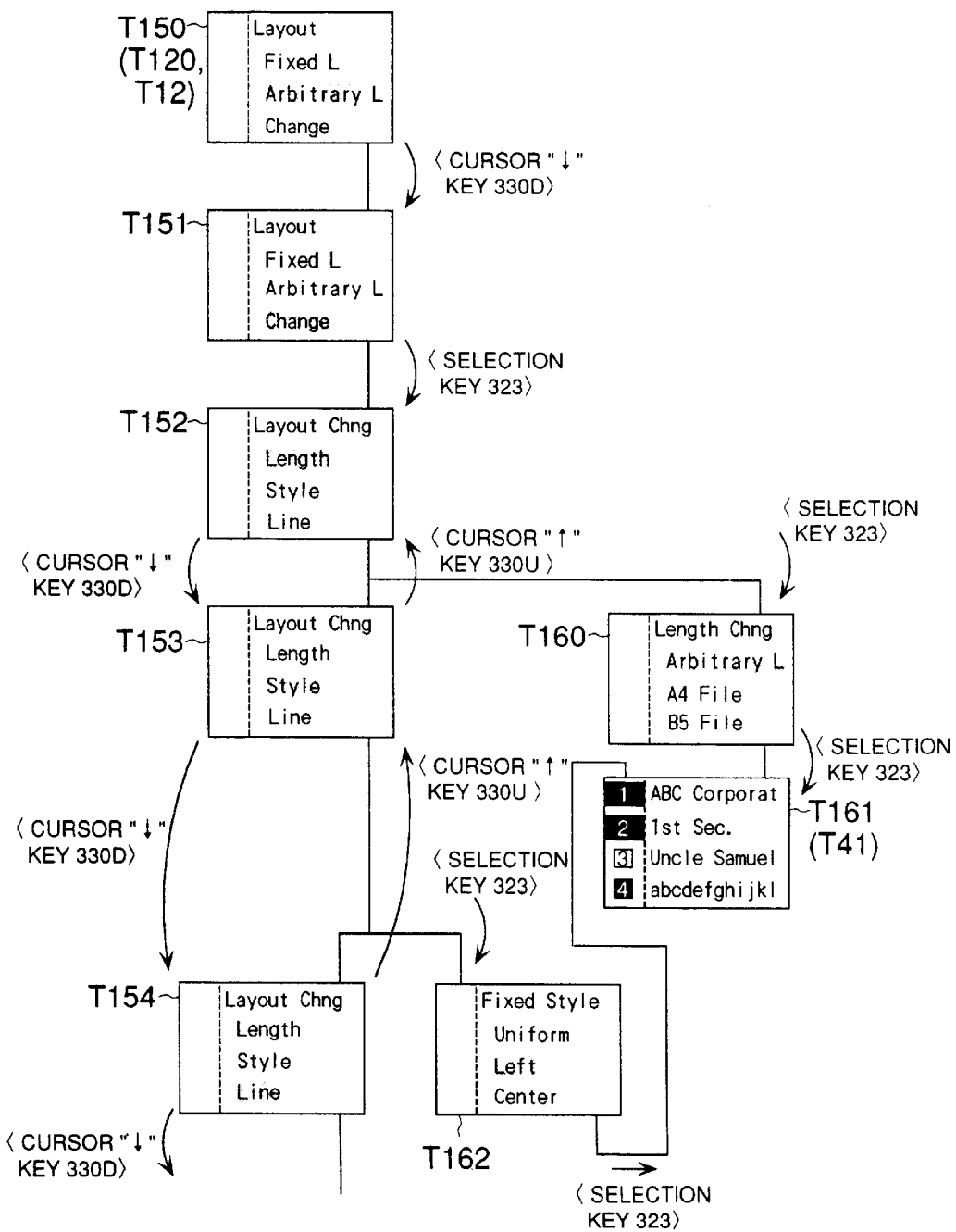
FIG. 30 is a diagram showing an example of a sequence of screens displayed when a character image layout method is changed and operations each carried out to display the following or preceding screen.

Referring now to FIG. 30, if the cursor "↓" key 330D is operated from the above state (T150: identical to T12 in FIG. 7 and T120 in FIG. 27) to display the option "Change" in the shaded manner (T151) and then the selection key 323 is depressed, a selection screen for changing the layout of character string image data is displayed (T152).

Figure 31:
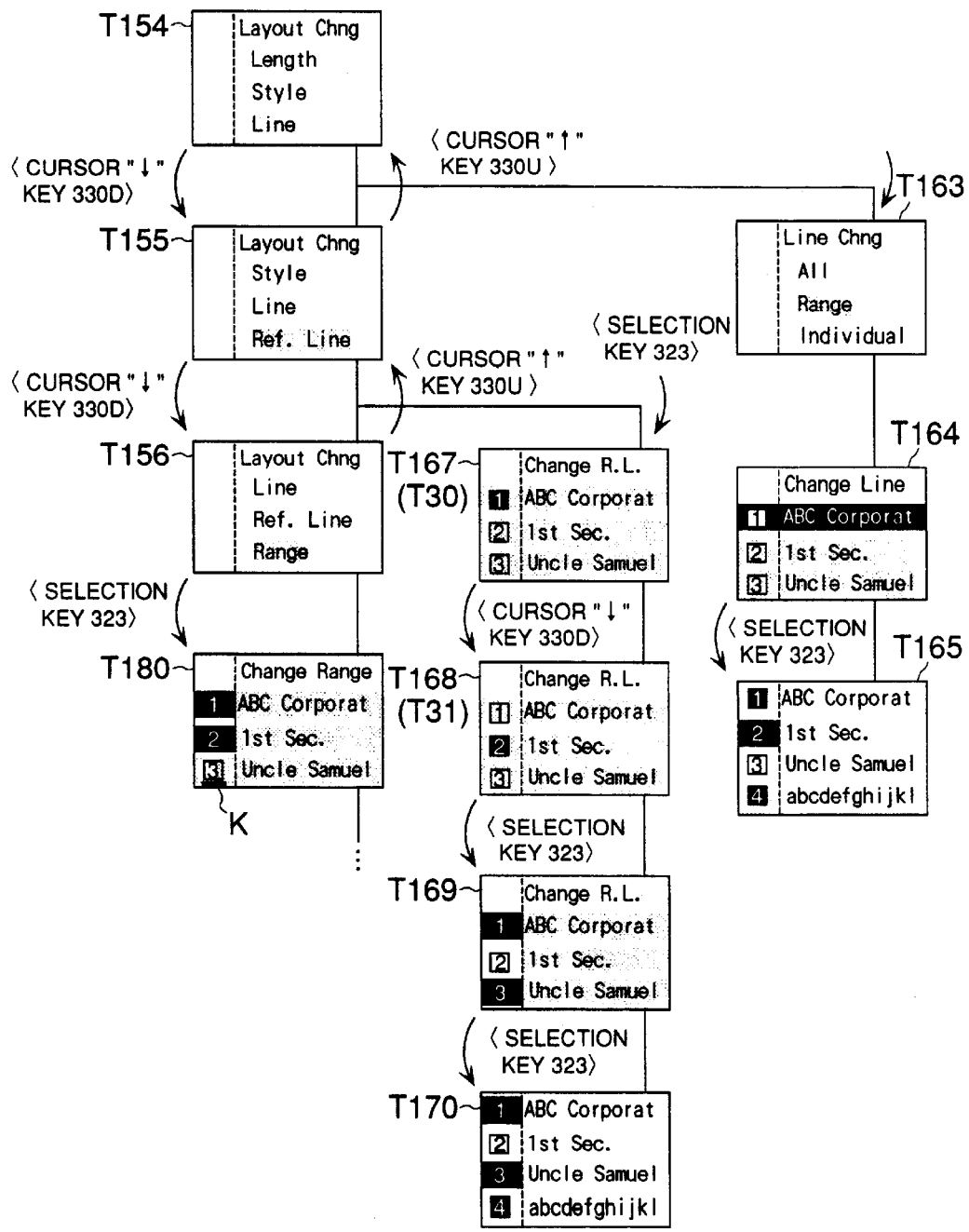
FIG. 31 is a continuation of the FIG. 30 diagram.

By operating the cursor "↑" key 330U or the cursor "↓" key 330D from the above state (T152), as shown in FIGS. 30 to 31, options of operations required for respective changes in layout can be displayed in the shaded manner (T152 to T156). When the selection key 323 is depressed, screens for carrying out respective changing operations are displayed (T160, T162, T163, T167, T180, etc.).

For instance, if an option "Fixed/Arbt" (Fixed Length/Arbitrary Length) for changing a preset length of a reference line for determining the full layout range is selected and displayed in the shaded manner and then the selection key 323 is depressed (T152), a screen for changing the preset length (T160) is displayed. In this state (T160), it is possible to select from an option "Arbitrary L" for designating an arbitrary length and options for designating respective lengths of the fixed formats ("A4 File", etc.) as described above in FIG. 27 or directly designate an arbitrary length (see T140 in FIG. 27).

In the above process, if any of preset lengths is selected (displayed in the shaded manner) or directly designated and then the selection key 323 is depressed, the screen returns to the text entry screen, but the change in the preset length is not reflected in display on the text entry screen, but a screen identical to one described above with reference to FIG. 11, for instance, is displayed (T161: identical to T41 in FIG. 11). Of course, character string image data is changed in accordance with this change in the preset length, and hence the result of the change can be confirmed if the character string image data is printed.

Further, if an option "Style" for changing the layout style of lines other than the reference line in the full layout range is selected and displayed in the shaded manner (T153) and then the selection key 323 is depressed, a screen for changing the layout style is displayed (T162). In this state (T162), if a desired layout style (e.g. "Left") is selected from the options described above with reference to FIG. 7 (T13) or the like, such as "Uniform", "Left", etc. and then the selection key 323 is depressed, in this case as well, the change in the layout style is not reflected in display on the text entry screen, but the screen identical to one described above with reference to FIG. 11 is displayed (T161: identical to T41 in FIG. 11).

If the apparatus 1 is configured such that the selected preset length is displayed in a corner of the text entry screen, and/or each character is displayed according to a layout set by the layout process, the result of the change in the preset length or layout style can be confirmed on the text entry screen. This will further enhance the usefulness and operability of the apparatus.

However, in the tape printing apparatus 1, the keyboard 3 described above with reference to FIG. 4 has the image key 328 for alternately switching between the text entry screen and the display screen (image screen) for displaying print image data. The result of the layout process may be confirmed on the image screen.

Further, as shown in FIG. 31, if an option "Line" for changing lines to be laid out is selected and displayed in the shaded manner (T154) and then the selection key 323 is depressed, first, a selection screen for selecting a method of designating lines to be laid out is displayed (T163: different from T14 in FIG. 8 only in menu title).

Lines to be laid out can be selected from the above state (T163) by designating the option "Range" or "Individual"), in the same manner as described above with reference to FIGS. 8 and 9, or FIG. 15. If the second to third lines, for instance, are selected as lines to be laid out (T164) and then the selection key 323 is depressed, the text entry screen reflecting the change in lines to be laid out is displayed (T165) and character string image data is formed based on the resulting lines to be laid out.

Further, if an option "Ref. Line" (Reference line) for changing the reference line is selected and displayed in the shaded manner (T155) and then the selection key 323 is depressed, a screen similar to one shown in FIG. 10 (T167: different from T30 in FIG. 10 only in menu title) is displayed as the screen for changing the reference line.

If the second line, for instance, is selected as the reference line from the above state (T167) in the same manner as described above with reference to FIG. 10 (T168: different from T31 in FIG. 10 only in menu title) and then the selection key 323 is depressed, it is possible to confirm that the reference line has been changed (T169: the second line and the third line are displayed inversely compared with those in the screen T33 in FIG. 10). If the selection key 323 is further depressed, the text entry screen showing the change in the reference line is displayed (T170) and character string image data is formed based on the resulting lines to be laid out.

Further, if an option "Range" for changing the layout range is selected and displayed in the shaded manner (T156) and then the selection key 323 is depressed, a screen identical to one shown in FIG. 11 is displayed as a screen for changing the reference line (T180: different from T40 in FIG. 10 only in menu title).

From this state (T180), a new layout range can be set in the same manner as described above with reference to FIG. 11, etc. The menu of setting a layout range has been described hereinabove based a lot of examples, and description thereof will be omitted.

As described hereinabove, according to the tape printing apparatus 1, character images can be laid out not only though a procedure of operations described above with reference to FIG. 6, but also through only part of the procedure of operations, which makes it possible to call existing character string image data and with its layout settings and change part of the settings or further modify the layout of the character string images. This makes it possible to freely modify character string image data, thereby enhancing the usefulness and operability of the apparatus.

The invention is not necessarily limited to the above embodiments, but it can be put into practice in various forms.

For instance, although in the above embodiments, when the fixed length is set, the reference line is automatically laid out according to a layout style set in advance, this is not limitative, but it is possible to configure the apparatus such that the user can select whether or not to automatically lay out a character string image on the reference line.

Figure 32:
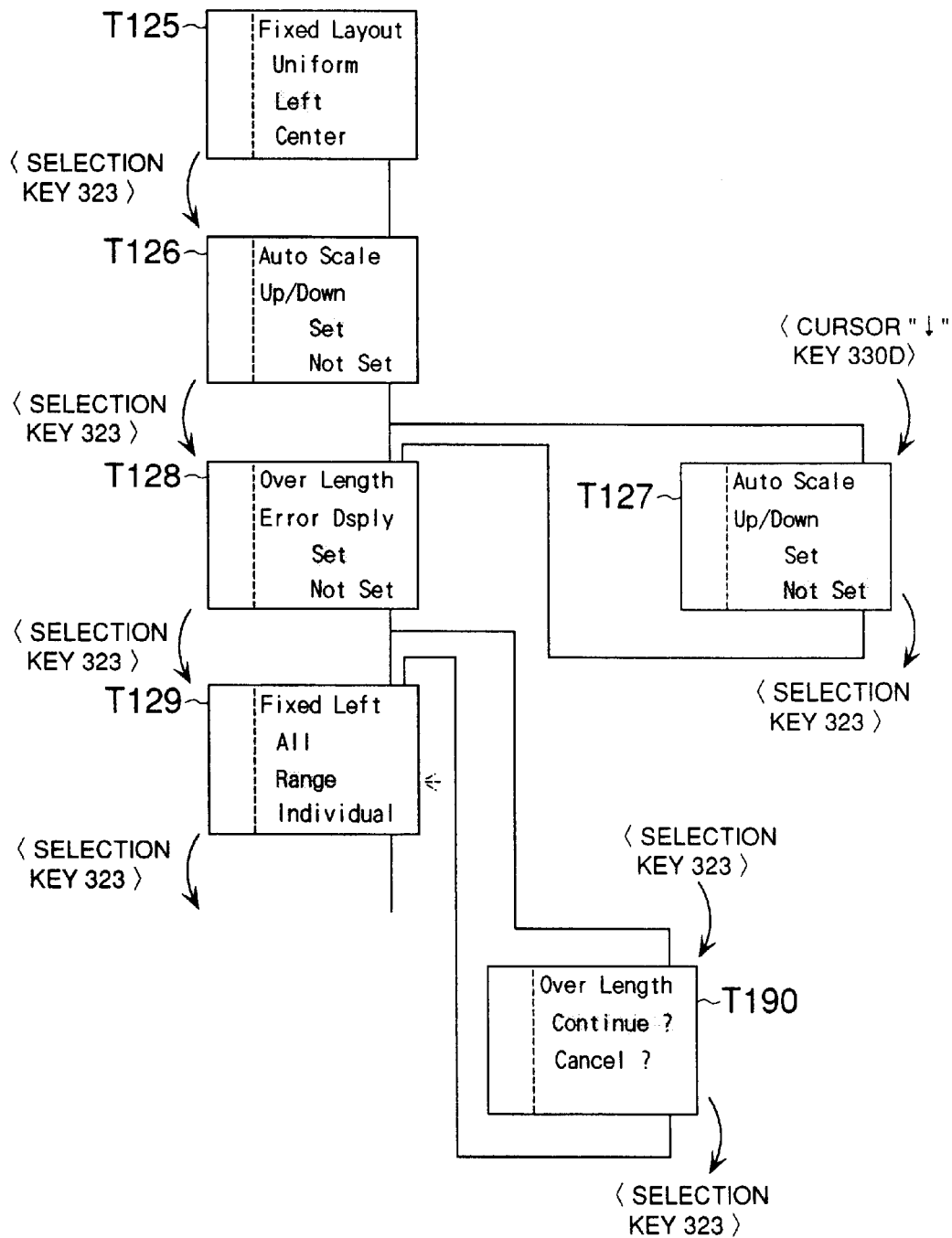
FIG. 32 shows an example of a sequence of screens displayed during setting of an automatic scale up/down mode for automatically expanding or reducing a reference line when a fixed length is set by the user and an error message display option for displaying an error message when a reference line is longer than the range of the fixed length, and operations each carried out to display the following or preceding screen.

More specifically, if the option "Left" is selected (displayed in the shaded manner) as a layout style from the options of the menu "Fixed Layout" (fixed length layout), in the example shown in FIG. 27, similarly to the FIG. 7 example of the arbitrary length layout, a selection screen is displayed which prompts the user to select a method of designating lines to be laid out therefor (screen having the same contents as T14 in FIG. 8, with the menu title is changed from "Align Left" to "Fixed Left": identical to T129 in FIG. 32). However, the apparatus may be configured such that the user can select whether or not to set an "Auto Scale Up/Down" mode for automatically expanding or reducing the size of a reference line.

That is, as shown in FIG. 32, if a layout style is selected (displayed in the shaded manner) and the selection key 323 is depressed, a selection screen is displayed, which prompts the user to determine whether or not the auto scale up/down mode is to be set (T126).

From the above state (T126), it is possible to select whether or not the character string image on the reference line is to be automatically laid out (in the present case, expanded or reduced in size) and set the selected layout mode (T126 to T127). If the auto scale up/down mode is set, although the fixed length layout process is executed, it is not required to consider the layout or arrangement of the reference line within the range of the fixed length and a scale up/down ratio for scaling up or down the size of the reference line, so that the trouble of setting them can be saved. On the other hand, if the that the auto scale up/down mode is not set, it is possible to prevent an unexpected layout process from being executed and select a layout method and a scale up/down ratio as the situation requires. Thus, the usefulness and operability of the apparatus are enhanced.

Of course, the apparatus may be configured such that the user can select whether or not to automatically effect the uniform layout similarly to the above case of the auto scale up/down mode.

Further, as shown in FIG. 32, an error message display option ("Over Length Error Dsply" on the screen) may be set for notifying the user of a reference line being longer than the range of the fixed length when the length of the reference line before being laid out is longer than the length of the range of the fixed length. More specifically, when the selection key 323 is depressed in the above state (T126 or T127), a selection screen is displayed which prompts the user to select whether or not to set the error message display option (T128), i.e. whether or not to select the option of ("Over Length Error Dsply").

In the case where the error message display option is selected, if the length of the reference line before being laid out is longer than that of the range of the fixed length, the user is notified of this fact. This enables the user to easily know that the character string image on the reference line is longer than the length of the range of the fixed length. Hence, when the automatic layout is carried out, this option enables the user to cope with an unexpected or improper layout more quickly. Even if the automatic layout is not carried out, the option makes it easier to prevent an unexpected or improper layout from being carried out.

For instance, assuming that an option "Set" has been selected i.e. displayed in the shaded manner in the above state (T128) and then the selection key 323 is depressed to set this option, if the length of each line to be a candidate for a line to be laid out is longer than the preset length, the length of a character string image on a reference line becomes longer than the length of the range of the fixed length whichever line may be designated as the reference line. Therefore, the screen is not switched to the screen (T129) for setting a method of designating lines to be laid out, but to a message screen "Over length" (T190).

When the auto scale up/down mode is not set (see T127), the above message "Over Length" is displayed, while the user is prompted to select whether or not the fixed length layout process is to be continued (T190). If an option "Continue" is selected and displayed in the shaded manner and then the selection key 323 is depressed, the screen for setting the method of designating lines to be laid out is displayed (T129). On the other hand, if an option "Cancel" is selected, the layout process is cancelled, followed by returning to the text entry screen displayed before the layout process was started (e.g. T10 in FIG. 7).

Further, When the auto scale up/down mode has been set (see T126), only the message "Over Length" is displayed in the above state (T190), and hence if the selection key 323 is depressed, similarly to the case of the option "Continue" being selected, the screen T129 is displayed (T129).

It should be noted that once the above auto scale up/down mode and the option of displaying the message "Over Length" are set, they are maintained unless they are canceled, and that when the layout changing process described above with reference to FIGS. 30 to 31 are carried out, they are displayed at a time point of occurrence of a state where the reference line is caused to become longer than the fixed length by a change in the settings.

Figure 33:
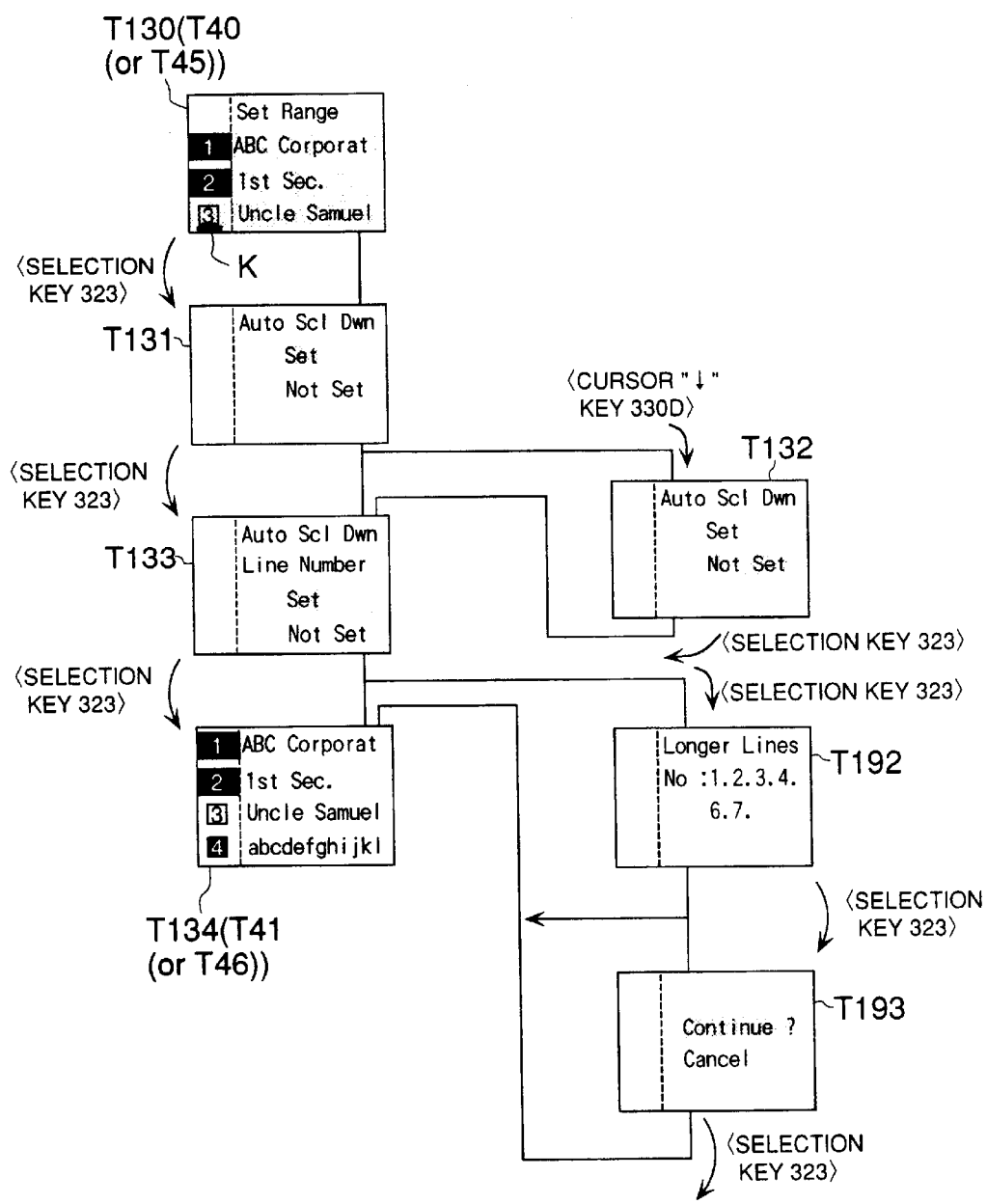
FIG. 33 shows an example of a sequence of screens displayed during setting of an automatic scale-down mode and an automatic scale down line number notification mode therefor and operations each carried out to display the following or preceding screen in the sequence.

Similarly, as shown in FIG. 33, the apparatus may be configured such that the user can select whether or not to set an automatic scale down mode ("Auto Scl Dwn") for automatically reducing the size of line to be laid out, when the length of a character string image on the line is longer than that of the layout range.

More specifically, as shown in FIG. 33, if the selection key 323 is depressed, for instance, in the state of a screen T130 (corresponding to T40 in FIG. 11, T45 in FIG. 13, etc.: here the FIG. 11 example is employed) immediately before returning to the text entry screen (T41 in FIG. 11, T46 in FIG. 13, etc.), a selection screen which prompts the user to select whether or not to set the automatic scale down mode is displayed (T131).

From the above state (T131), it is possible to set whether or not a line to be laid out which is longer than the length of the layout range is to be automatically reduced in size (T131 to T132). In this process, if the automatic scale down mode is set, it is not required to consider the layout or arrangement of the line to be laid out, and a scale up/down ratio for scaling up or down the size of the line, whereby the trouble of setting them can be saved. On the other hand, if the automatic scale down mode is not set, it is possible to prevent an unexpected or undesired line from being reduced in size but select a layout method and a scale up/down ratio as the situation requires. Thus, the usefulness and operability of the apparatus are enhanced.

Further, as shown in FIG. 33, an option of automatic scale down line number notification mode may be set for notifying the user of the presence of a line to be laid out which is to be reduced in size, i.e. whose character string image is longer than the length of the layout range (by its line number in the present embodiment). In this case, when the selection key 323 is depressed in the above state (T131 or T132), a selection screen is displayed for prompting the user to select whether or not the line number notification display mode "Auto Scl Dwn Line number" is to be set (T133). In this state (T133), it is possible to select whether or not to set the line number notification mode.

When the line number notification mode is set, if the length of a character string image on any of the lines to be laid out is longer than the length of its layout range, the user is notified of the longer lines to be laid out. This enables the user to easily know that a character string image on the line to be laid out is longer than that of the layout range. Therefore, when the automatic layout process is carried out, the user can cope with an expected or undesired layout more quickly, whereas when the automatic layout is not carried out, the display mode makes it easier to prevent unexpected layout processing from being carried out.

For instance, in the above state (T133), if an option "Set" is selected (displayed in the shaded manner) and then the selection key 323 is depressed, it is determined as to each line to be laid out whether or not the line is longer than the layout range set for layout thereof. When there are any lines longer than its layout range, the screen does not return to the text entry screen, but first, the line numbers of the longer lines are displayed (T192). In the illustrated example, the line numbers of the first, second, third, fourth, sixth and seventh lines are displayed (in the FIG. 12 example, only the line number of the first line will be displayed as a line longer than the layout range).

After the lines longer than the layout range are confirmed by their line numbers displayed (T192), if the selection key 323 is depressed, a selection screen for selecting whether or not the present operation is to be continued is displayed (T193), if the automatic scale down mode has not been set (see T132). If an option "Continue" is displayed in the shaded manner and the selection key 323 is depressed, each line having a line number thereof displayed is determined as a line to be reduced in size, followed by returning to the text entry screen (T134). If an option "Cancel" is selected, the lines are set such that the scale down process is not carried out thereon, followed by returning to the text entry screen (T134).

On the other hand, if the automatic scale down mode has been set (see T133), and the selection key 323 is depressed in the state of the screen 192, the longer lines having their number displayed are determined as lines to be reduced in size, similarly to the above case where the option "Continue" was selected, followed by returning to the text entry screen (T134).

Once the above automatic scale down mode for reducing the size of a line longer than the layout range and the automatic scale down line number notification mode are set, they are maintained unless they are canceled, and that when the layout changing process described above with reference to FIGS. 30 to 31 are carried out, the display is carried out at a time point of occurrence of a state where any line to be laid out becomes longer than the layout range therefor by a change in the settings.

Further, the FIG. 32 operating procedure may be configured such that the display of "Over Length" is permitted to be set only when the auto scale up/down mode is not set, or the FIG. 33 operating procedure may be configured such that the notification mode for displaying line numbers of lines to be laid out which are longer than the layout range is permitted to be set only when the automatic scale down mode is not set. Further, the procedure may be configured such that desired ones of longer lines having line numbers thereof displayed can be selectively set to lines to be reduced in size by the automatic scale down process.

It should be noted that various changes and modifications other than the above can be made. For instance, the tape printing apparatus 1 is capable of changing letter sizes (see T11 in FIG. 7), so that a configuration is possible in which character images having letter sizes thereof set for a layout process can be arranged in a predetermined partial layout range. Furthermore, the apparatus 1 is also capable of changing character spacing, and hence a similar configuration may be effected in character spacing.

Moreover, the apparatus can be configured such that the user can select whether or not to automatically execute the changing of the letter size and setting of character spacing or whether or not to display error messages under predetermined conditions. That is, the apparatus may be configured such that the user can select from options for setting whether or not character sizes and character spacing are to be changed and whether such operations are to be carried out automatically or manually.

Although the FIG. 5 control process is described assuming that the same control process is carried out by a method of task interrupt handling responsive to key entries, this is not limitative, but it goes without saying that the same control process can be realized by other methods, such as a method of management of independent programs for respective different processes, by multitask processing.

Although in the above embodiments, a character image layout method and a device therefor according to the invention are applied to a tape printing apparatus of an ink jet type, but this is not limitative, but the same can be applied to various kinds of tape printing apparatuses, such as of a sublimation transfer type in which sublimation of ink is effected by using heating elements of thermal heads, of a melting transfer type, etc. Furthermore, it goes without saying that as a tape fed from a tape cartridge, there may be employed not only a release paper (peel-off paper)-backed adhesive tape but also a tape without using a release paper (peel-off paper), such as a transfer tape and an iron print transfer tape, which are commercially available.

Further, the character image layout method and device according to the invention can be applied to an information processing apparatus other than a tape printing apparatus. That is, the character image layout method and device can be applied to a stamp making apparatus as its character image layout method and device which lay out character images so as to obtain a stamp image to be formed on the stamping face of a stamp.

It is further understood by those skilled in the art that the foregoing is a preferred embodiment of the invention, and that various changes and modifications may be made without departing from the spirit and scope thereof.

What is claimed is:

1. A method of laying out character images by carrying out layout processing on n lines ($2 \leq n \leq m$) out of m lines ($m \geq 2$) of character string images, the method comprising the steps of:
selecting a desired one of said n lines of character string images that have been previously inputted, as a reference line;
carrying out said layout processing on said n lines of character string images in a manner such that said n lines of character string images are laid out to a layout range defined as a predetermined range of length of said reference line without changing a number of characters and lines of the character string images; and
carrying out scale-down processing on a character string image of any of said n lines in a manner such that said character string image is reduced to be adapted in size to said layout range, if a length of said character string image of said any of said n lines of character string images is longer than a length of said layout range.

2. A method according to claim 1, including the step of designating a range of length of an image of at least one character on said reference line as said layout range.

3. A method of laying out character images by carrying out layout processing on n lines ($2 \leq n \leq m$) out of m lines ($m \geq 2$) of character string images, the method comprising the steps of:
selecting a desired one of said n lines of character string images as a reference line;
carrying out said layout processing on said n lines of character string images in a manner such that said n lines of character string images are laid out to a layout range defined as a predetermined range of length of said reference line; and
carrying out scale-down processing on a character string image of any of said n lines in a manner such that said character string image is reduced to be adapted in size to said layout range, if a length of said character string image of said any of said n lines of character string images is longer than a length of said layout range;
wherein said layout processing includes uniform layout processing for arranging character images of each character string image at equal space intervals, left end alignment processing for aligning a left end of each character string image to a left end of a predetermined range, right end alignment processing for aligning a right end of each character string image to a right end of a predetermined range, center alignment processing for aligning a center of each character string image to a center of a predetermined range, scale-up processing for expanding a size of each character image of a character string image in a manner such that a length of said character string image is made correspondent to a predetermined range, and said scale-down processing for reducing a size of each character image of a character string image in a manner such that a length of said character string image is made correspondent to a predetermined range.

4. A method according to claim 3, wherein the step of carrying out said layout processing includes, when a length of a character string image on any of said n lines is equal to or shorter than said length of said layout range, laying out each character image of said character string image on said any of said n lines, within said layout range, by any of said uniform layout processing, said left end alignment processing, said right end alignment processing, said center alignment processing, and said scale-up processing.

5. A method according to claim 4, further including the step of selecting one of said uniform layout processing, said left end alignment processing, said right end alignment processing, said center alignment processing, and said scale-up processing, and wherein the step of carrying out said layout process includes carrying out the selected one of said uniform layout processing, said left end alignment processing, said right end alignment processing, said center alignment processing, and said scale-up processing.

6. A method according to claim 1, further including the step of carrying out a setting concerning whether or not said scale-down processing is automatically carried out, when a character string image on any of said lines to be laid out is longer than said length of said layout range.

7. A method according to claim 1, further including the step of carrying out notification when any of said n lines of character string images is longer than said layout range.

8. A method according to claim 1, further including the step of selecting said n lines out of said m lines of character string images as lines to be laid out.

9. A method according to claim 8, wherein the step of selecting said n lines includes the step of designating n consecutive lines out of said m lines of character string images by range selection.

10. A method according to claim 8, wherein the step of selecting said n lines includes the step of designating lines to be laid out by marking n desired lines out of said m lines of character string images.

11. A method of laying out character images by carrying out layout processing on n lines ($2 \leq n \leq m$) out of m lines ($m \geq 2$) of character string images, the method comprising the steps of:

selecting a desired one of said n lines of character string images as a reference line;

carrying out said layout processing on said n lines of character string images in a manner such that said n lines of character string images are laid out to a layout range defined as a predetermined range of length of said reference line; and carrying out scale-down processing on a character string image of any of said n lines in a manner such that said character string image is reduced to be adapted in size to said layout range, if a length of said character string image of said any of said n lines of character string images is longer than a length of said layout range;

setting an arbitrary length as a length of a range of a fixed length; and laying out each character image on said reference line by at least one of scale-up processing or said scale-down processing, and uniform layout processing in a manner such that said length of said character string image on said reference line is made equal to said length of said range of said fixed length, said layout range being determined based on said character string image on said reference line having said each character image laid out thereon.

12. A method according to claim 11, further including the step of carrying out a setting concerning whether or not said each character image on said reference line is automatically laid out so as to make said length of said character string image equal to said length of said range of said fixed length.

13. A method according to claim 11, further including the step of carrying out notification when said length of said character string image on said reference line is longer than said length of said range of said fixed length, before laying out said each character image on said reference line so as to make said length of said character string image equal to said length of said range of said fixed length.

14. A character image layout device for laying out character images by carrying out layout processing on n lines ($2 \leq n \leq m$) out of m lines ($m \geq 2$) of character string images, the character image layout device comprising:

a reference line-selecting section for selecting a desired one of said n lines of character string images that have been previously inputted, as a reference line;

a layout section for carrying out said layout processing on said n lines of character string images in a manner such that said n lines of character string images are laid out to a layout range defined as a predetermined range of length of said reference line without changing a number of characters and lines of the character string images; and a scale-down processing section for carrying out scale-down processing on a character string image of any of said n lines in a manner such that said character string image is reduced to be adapted in size to said layout range, if a length of said character string image of said any of said n lines of character string images is longer than a length of said layout range.

15. A character image layout device according to claim 14, including a layout range-designating section for designating a range of length of an image of at least one character on said reference line as said layout range.

16. A character image layout device for laying out character images by carrying out layout processing on n lines ($2 \leq n \leq m$) out of m lines ($m \geq 2$) of character string images, the character image layout device comprising:

a reference line-selecting section for selecting a desired one of said n lines of character string images as a reference line;

a layout section for carrying out said layout processing on said n lines of character string images in a manner such that said n lines of character string images are laid out to a layout range defined as a predetermined range of length of said reference line; and a scale-down processing section for carrying out scale-down processing on a character string image of any of said n lines in a manner such that said character string image is reduced to be adapted in size to said layout range, if a length of said character string image of said any of said n lines of character string images is longer than a length of said layout range;

wherein said layout processing includes uniform layout processing for arranging character images of each character string image at equal space intervals, left end alignment processing for aligning a left end of each character string image to a left end of a predetermined range, right end alignment processing for aligning a right end of each character string image to a right end of a predetermined range, center alignment processing for aligning a center of each character string image to a center of a predetermined range, scale-up processing for expanding a size of each character image of a character string image in a manner such that a length of said character string image is made correspondent to a predetermined range, and said scale-down processing for reducing a size of each character image of a character string image in a manner such that a length of said character string image is made correspondent to a predetermined range.

17. A character image layout device according to claim 16, wherein when a length of a character string image on any of said n lines of is equal to or shorter than said length of said layout range, said layout processing section lays out each character image of said character string image on said any of said n lines, within said layout range, by a selected one of said uniform layout processing, said left end alignment processing, said right end alignment processing, said center alignment processing, and said scale-up processing.

18. A character image layout device according to claim 17, further including a layout processing-selecting section for selecting one of said uniform layout processing, said left end alignment processing, said right end alignment processing, said center alignment processing, and said scale-up processing, and said layout processing section carrying out the selected one of said uniform layout processing, said left end alignment processing, said right end alignment processing, said center alignment processing, and said scale-up processing.

19. A character image layout device according to claim 14, further including a scale-down processing setting section for carrying out a setting concerning whether or not said scale-down processing is automatically carried out, when a character string image on any of said lines to be laid out is longer than said length of said layout range.

20. A character image layout device according to claim 14, further including a notification section for carrying out notification when any of said n lines of character string images is longer than said layout range.

21. A character image layout device according to claim 14, further including a layout line-selecting section for selecting said n lines out of said m lines of character string images as lines to be laid out.

22. A character image layout device according to claim 21, said layout line-selecting section includes means for designating n consecutive lines out of said m lines of character string images by range selection.

23. A character image layout device according to claim 21, said layout line-selecting section includes means for designating lines to be laid out by marking n desired lines out of said m lines of character string images.

24. A character image layout device for laying out character images by carrying out layout processing on n lines ($2 \leq n \leq m$) out of m lines ($m \geq 2$) of character string images, the character image layout device comprising:
  a reference line-selecting section for selecting a desired one of said n lines of character string images as a reference line;
  a layout section for carrying out said layout processing on said n lines of character string images in a manner such that said n lines of character string images are laid out to a layout range defined as a predetermined range of length of said reference line;
  a scale-down processing section for carrying out scale-down processing on a character string image of any of said n lines in a manner such that said character string image is reduced to be adapted in size to said layout range, if a length of said character string image of said any of said n lines of character string images is longer than a length of said layout range;
  a fixed line-setting section for setting an arbitrary length as a length of a range of a fixed length; and
  a reference line layout section for laying out each character image on said reference line by at least one of scale-up processing or said scale-down processing, and uniform layout processing in a manner such that said length of said character string image on said reference line is made equal to said length of said range of said fixed length, said layout range being determined based on said character string image on said reference line having said each character image laid out thereon.

25. A character image layout device according to claim 24, further including a reference line layout-setting section for carrying out a setting concerning whether or not said each character image on said reference line is automatically laid out so as to make said length of said character string image equal to said length of said range of said fixed length.

26. A character image layout device according to claim 24, further including a notification section for carrying out notification when said length of said character string image on said reference line is longer than said length of said range of said fixed length, before laying out said each character image on said reference line so as to make said length of said character string image equal to said length of said range of said fixed length.

27. A method of laying out character images by carrying out layout processing on n lines ($2 \leq n \leq m$) out of m lines ($m \geq 2$) of character string images, the method comprising the steps of:
  selecting a desired one of said n lines of character string images that have been previously inputted, as a reference line;
  automatically carrying out by selecting said reference line said layout processing on said n lines of character string images in a manner such that said n lines of character string images are laid out to a layout range defined as a predetermined range of length of said reference line; and
  automatically carrying out by selecting said reference line scale-down processing on a character string image of any of said n lines in a manner such that said character string image is reduced to be adapted in size to said layout range, if a length of said character string image of said any of said n lines of character string images is longer than a length of said layout range.

* * * * *